US005490000A

United States Patent [19]

Tanaka et al.

[11] Patent Number: 5,490,000

[45] Date of Patent: Feb. 6, 1996

[54] DEFORMED HELIX FERROELECTRIC LIQUID CRYSTAL DISPLAY DEVICE AND METHOD OF DRIVING

[75] Inventors: Tomio Tanaka, Hachioji; Katsuhito Sakamoto, Yokohama, both of Japan

[73] Assignee: Casio Computer Co., Ltd., Tokyo, Japan

[21] Appl. No.: 162,334

[22] Filed: Dec. 3, 1993

[30] Foreign Application Priority Data

| | | | |
|---|---|---|---|
| Dec. 7, 1992 | [JP] | Japan | 4-327002 |
| Dec. 24, 1992 | [JP] | Japan | 4-343710 |
| Dec. 24, 1992 | [JP] | Japan | 4-343711 |

[51] Int. Cl.$^6$ .......... G02F 1/1343; G02F 1/13

[52] U.S. Cl. .......... 359/56; 359/100

[58] Field of Search .......... 359/56, 100; 345/97

[56] References Cited

U.S. PATENT DOCUMENTS

| | | | |
|---|---|---|---|
| Re. 33,120 | 11/1989 | Nagae et al. | 350/350 S |
| 5,073,010 | 12/1991 | Johnson et al. | 359/72 |
| 5,109,295 | 4/1992 | Sato et al. | 359/100 |
| 5,227,900 | 7/1993 | Inaba et al. | 359/56 |

FOREIGN PATENT DOCUMENTS

| | | | |
|---|---|---|---|
| 62-87941 | 4/1987 | Japan | 359/56 |
| 62-175714 | 8/1987 | Japan | 359/56 |
| 63-60428 | 3/1988 | Japan | 359/56 |
| 63-124036 | 5/1988 | Japan | 359/56 |
| 63-235919 | 9/1988 | Japan | 359/56 |
| 63-278029 | 11/1988 | Japan | 359/56 |

OTHER PUBLICATIONS

L. A. Beresnev; "Deformed Ferroelectric Liquid Crystal Display; A New Electrooptic Mode in Ferroelectric Chiral Smectic C Liquid Crystals"; 1988; Liquid Crystals; vol. 5, No. 4, pp. 1171–1177.

*Primary Examiner*—William L. Sikes
*Assistant Examiner*—Charles Miller
*Attorney, Agent, or Firm*—Frishauf, Holtz, Goodman, Langer & Chick

[57] ABSTRACT

A liquid crystal display element includes one substrate on which pixel electrodes and TFTs connected to the pixel electrodes are arranged in a matrix form, the other substrate on which a counter electrode opposing the pixel electrodes is formed, and a ferroelectric liquid crystal sealed between the substrates and having a helical pitch smaller than a distance between the substrates. A row driver is connected to the TFTs to sequentially turn on the active elements. A column driver applies an initializing voltage consisting of first and second reset pulses for sequentially setting the ferroelectric liquid crystal in the first and second aligned states and a write voltage changing in accordance with the display gradation levels to the pixel electrodes through the ON active elements, thereby performing gradation display.

35 Claims, 13 Drawing Sheets

FIG.4
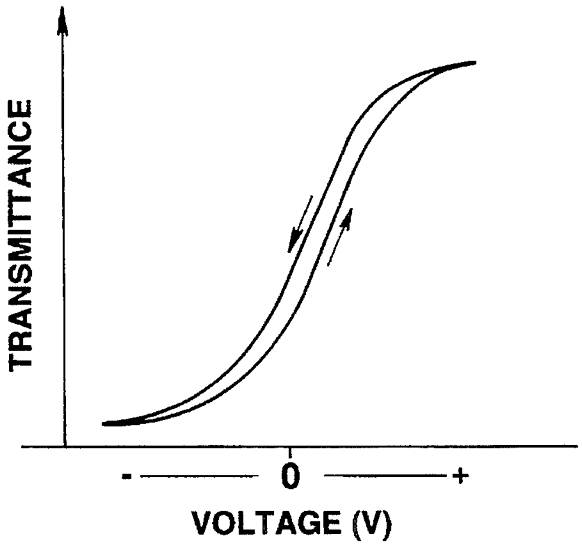
FIG.5A
FIG.5B
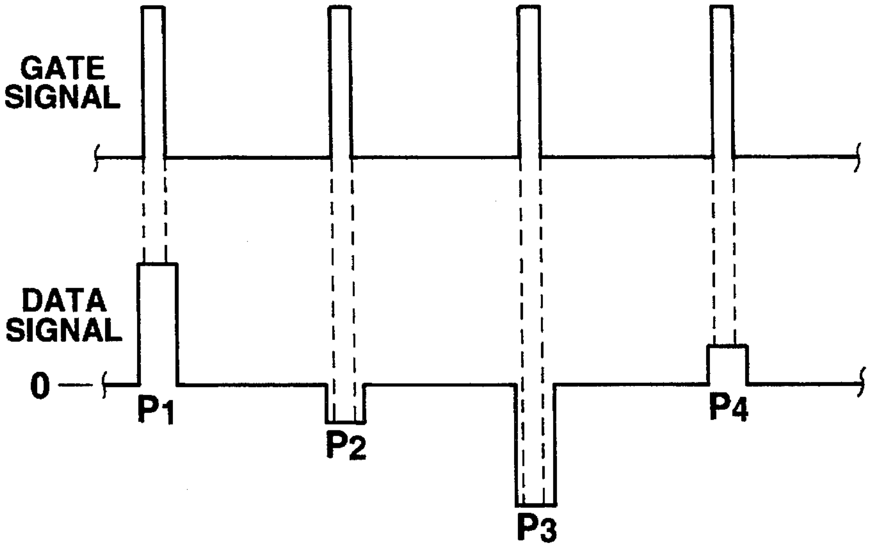

FIG.6A
FIG.6B
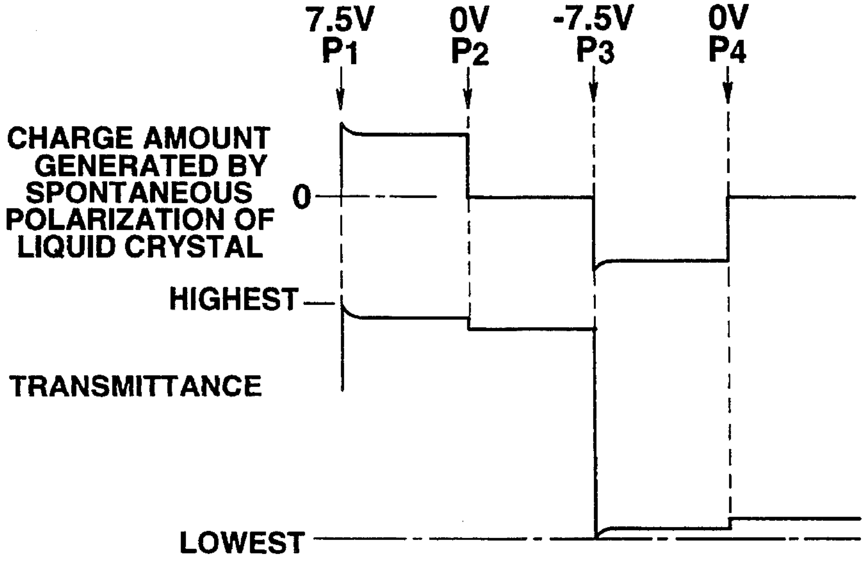
FIG.7A
FIG.7B
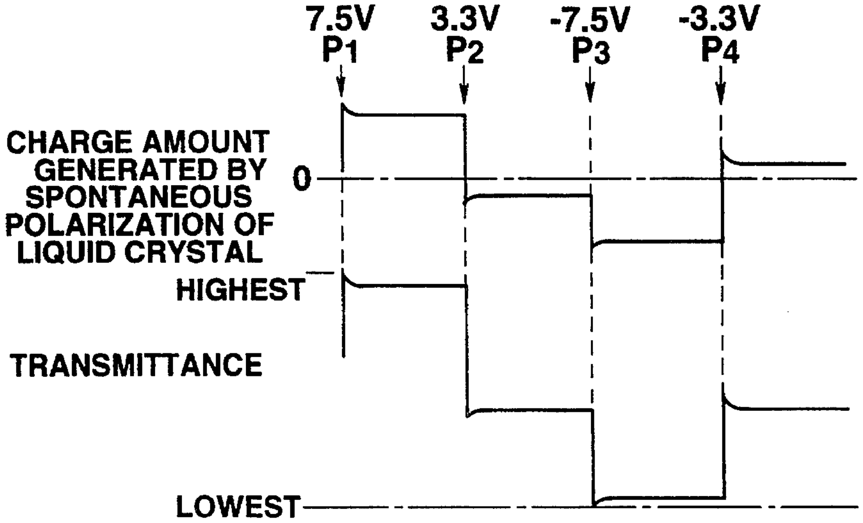

FIG.11A

VOLTAGE APPLIED TO PIXEL ELECTRODES OF KTH ROW

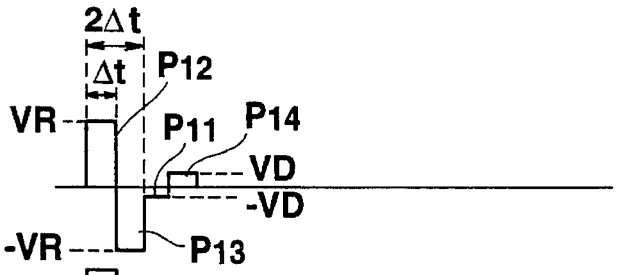

FIG.11B

VOLTAGE APPLIED TO PIXEL ELECTRODES OF (K+1)TH ROW

FIG.11C

VOLTAGE APPLIED TO PIXEL ELECTRODES OF (K+2)TH ROW

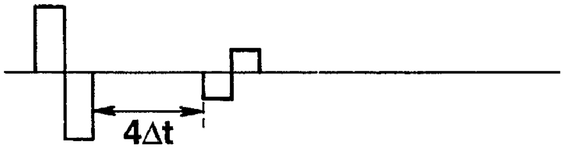

FIG.11D

VOLTAGE APPLIED TO PIXEL ELECTRODES OF (K+3)TH ROW

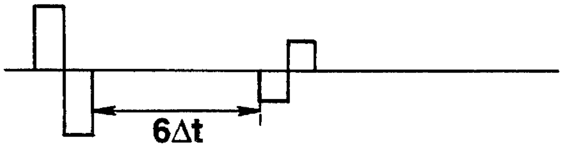

FIG.11E

VOLTAGE APPLIED TO PIXEL ELECTRODES OF (K+4)TH ROW

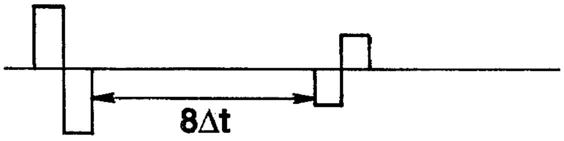

FIG.11F

VOLTAGE APPLIED TO PIXEL ELECTRODES OF (K+5)TH ROW

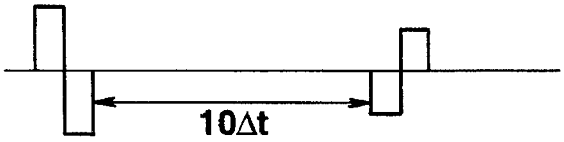

FIG.11G

VOLTAGE APPLIED TO PIXEL ELECTRODES OF (K+6)TH ROW

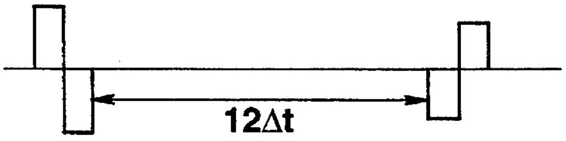

FIG.11H

VOLTAGE APPLIED TO PIXEL ELECTRODES OF (K+7)TH ROW

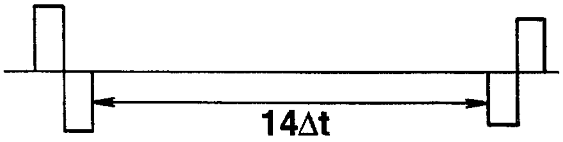

DEFORMED HELIX FERROELECTRIC LIQUID CRYSTAL DISPLAY DEVICE AND METHOD OF DRIVING

BACKGROUND OF THE INVENTION

1. Field of the Invention

The present invention relates to a liquid crystal display device using a ferroelectric liquid crystal and a method of driving a ferroelectric liquid crystal display element.

2. Description of the Related Art

A ferroelectric liquid crystal display element has advantages of a high-speed operation and a wide field angle over a TN-mode liquid crystal display element using a nematic liquid crystal.

Studies on practical applications of ferroelectric liquid crystal elements have been conventionally concentrated on a ferroelectric liquid crystal called an SS-F liquid crystal. The SS-F liquid crystal is a ferroelectric liquid crystal having a chiral smectic C-phase whose helical pitch is larger than the substrate distance (cell gap) of a liquid crystal element, and having a memory function (bistable state) in an aligned state.

The SS-F liquid crystal is sealed between the substrates of a liquid crystal display element in a state wherein the helical structure is not manifested. When a voltage of one polarity is applied to the SS-F liquid crystal, it is set in the first aligned state in accordance with the interaction between the applied voltage and spontaneous polarization. When a voltage of the other polarity is applied, the SS-F liquid crystal is set in the second aligned state. In the ferroelectric liquid crystal display element using the SS-F liquid crystal, the transmittance of light is controlled in accordance with the first and second aligned states and a pair of polarizing plates disposed on the incident and exit sides of the element, thereby displaying an image.

The aligned states of the SS-F liquid crystal are only the first and second aligned states. For this reason, the transmittance cannot be changed stepwise in the ferroelectric liquid crystal display element using the SS-F liquid crystal, and gradation display cannot be performed.

Ferroelectric liquid crystal display elements capable of performing gradation display have been studied, and use of a ferroelectric liquid crystal having a chiral smectic phase whose helical pitch is smaller than the substrate distance of a display element is proposed. A ferroelectric liquid crystal of this type having a memory function is called an SBF liquid crystal, and that having no memory function is called a DHF liquid crystal ("LIQUID CRYSTALS", 1989, Vol. 5, No. 4, pp. 1171–1177).

In a ferroelectric liquid crystal display element using an SBF liquid crystal, the SBF liquid crystal in a state of a helical structure is sealed between two substrates. When a voltage having an absolute value equal to or larger than a predetermined value is applied across electrodes through a liquid crystal layer, the SBF liquid crystal is set in the first or second aligned state in accordance with the polarity of the applied voltage. The first aligned state is a state in which the direction (director) of the long axis of each liquid crystal molecule is aligned almost parallel to the first direction, and the second aligned state is a state in which the director of each liquid crystal molecule is aligned in a direction almost parallel to the second direction. When the absolute value of the applied voltage is less than the predetermined value, the SBF liquid crystal is set in an intermediate aligned state wherein liquid crystal molecules whose directors are aligned in the first direction and liquid crystal molecules whose directors are aligned in the second direction are mixed.

In the ferroelectric liquid crystal display element using a DHF liquid crystal, the DHF liquid crystal in a state of a helical structure is sealed between substrates. When a voltage having an absolute value equal to or larger than a predetermined value is applied across electrodes through a liquid crystal layer, the DH liquid crystal is set in the first or second aligned state in accordance with the polarity of the applied voltage. The first aligned state is a state in which the director of each liquid crystal molecule is aligned in a direction almost parallel to the first direction, and the second aligned state is a state in which the director of each liquid crystal molecule is aligned in a direction almost parallel to the second direction. When the absolute value of the applied voltage is less than the predetermined value, the DHF liquid crystal is set in an intermediate aligned state wherein the average direction of the directors of the liquid crystal molecules is an intermediate direction between the first and second directions due to distortion in the helical structure of the molecular arrangement.

For this reason, if a voltage for maintaining the intermediate aligned state is kept applied to the liquid crystal display element of an active matrix type even during a nonselection period, gradation display using the SBF or DHF liquid crystal may be performed.

In practice, however, even if a voltage corresponding to a gradation level to be displayed is applied to the liquid crystal display element of the active matrix type, the applied voltage does not correspond to the transmittance of the pixels. As a result, gradation display in a practical sense cannot be realized due to the following reason. The optical characteristics (i.e., the relationship between the applied voltage and the transmittance) of the SBF and DHF liquid crystals have a large hysteresis. Even if a voltage corresponding to a display gradation level is applied to the liquid crystal, the display gradation level cannot be uniquely determined due to an influence of the past voltage applied to the element.

When the ferroelectric liquid crystal display element is of an active matrix type, the voltage held in each pixel cannot become zero immediately upon a power-OFF operation. For this reason, even after the power switch is turned off, the aligned state corresponding to the held voltage of the pixel is held in the liquid crystal to cause a display burn-in phenomenon.

SUMMARY OF THE INVENTION

It is an object of the present invention to provide a method of driving a ferroelectric liquid crystal display element capable of performing gradation display and a ferroelectric liquid crystal display device.

It is another object of the present invention to provide a method of driving a ferroelectric liquid crystal display element free from a display burn-in phenomenon and a ferroelectric liquid crystal display device.

In order to achieve the above objects according to the first aspect of the present invention, there is provided a method of driving a ferroelectric liquid crystal display element, comprising the steps of:

preparing a ferroelectric liquid crystal display element having one substrate on which a plurality of pixel electrodes and a plurality of active elements connected to the pixel electrodes are arranged in a matrix form, the other substrate on which a counter electrode opposing the pixel electrodes is formed, and a ferroelectric liquid crystal sealed between the substrates, having a helical structure with a smaller helical pitch than a distance between the substrates, and aligned in a first aligned state in which liquid crystal molecules are aligned substantially in one direction in accordance with a voltage applied between the pixel electrodes and the counter electrode, a second aligned state in which the liquid crystal molecules are aligned substantially in the other direction in accordance with the voltage, or an intermediate aligned state in which an average aligned direction of the liquid crystal molecules is an intermediate direction between one direction and the other direction;

turning on a given one of the active elements during a selection period of the given active element;

applying an initializing voltage, which aligns the ferroelectric liquid crystal in at least one of the first and second aligned states, to a corresponding one of the pixel electrodes and the counter electrode through the given active element during the selection period; and applying a write voltage corresponding to display data between the corresponding pixel electrode and the counter electrode through the given active element during the selection period upon application of the initializing voltage.

According to the second aspect of the present invention, there is provided a method of driving a ferroelectric liquid crystal display element, comprising the steps of:

preparing a ferroelectric liquid crystal display element having one substrate on which a plurality of pixel electrodes and a plurality of active elements connected to the pixel electrodes are arranged in a matrix form, the other substrate on which a counter electrode opposing the pixel electrodes is formed, and a ferroelectric liquid crystal sealed between the substrates, having a helical structure with a smaller helical pitch than a distance between the substrates, and aligned in a first aligned state in which liquid crystal molecules are aligned substantially in one direction in accordance with a voltage applied between the pixel electrodes and the counter electrode, a second aligned state in which the liquid crystal molecules are aligned substantially in the other direction in accordance with the voltage, or an intermediate aligned state in which an average aligned direction of the liquid crystal molecules is an intermediate direction between one direction and the other direction;

applying a voltage corresponding to display data between each of the pixel electrodes and the counter electrode during a display operation; and applying a voltage, which substantially nullifies a charge amount generated by spontaneous polarization of the ferroelectric liquid crystal, between the pixel and counter electrodes at an end of the display operation, and thereafter stopping drive of the ferroelectric liquid crystal display element.

According to the third aspect of the present invention, there is provided a ferroelectric liquid crystal display device comprising:

a ferroelectric liquid crystal display element having one substrate on which pixel electrodes and active elements connected to the pixel electrodes are arranged in a matrix form, the other substrate on which a counter electrode opposing the pixel electrodes is formed, and a ferroelectric liquid crystal sealed between the substrates and having a helical pitch smaller than a distance between the substrates;

first driving means, connected to the active elements, for sequentially turning on the active elements; and second driving means for applying a voltage for setting the ferroelectric liquid crystal in one of first and second aligned states to a given one of the pixel electrodes through a corresponding one of the active elements which is turned on by the first driving means, and thereafter applying a voltage changing in correspondence with a display gradation level to the given pixel electrode through the corresponding active element.

According to the fourth aspect of the present invention, there is provided a ferroelectric liquid crystal display device comprising:

a ferroelectric liquid crystal display element having one substrate on which pixel electrodes and active elements connected to the pixel electrodes are arranged in a matrix form, the other substrate on which a counter electrode opposing the pixel electrodes is formed, and a ferroelectric liquid crystal sealed between the substrates and having a helical pitch smaller than a distance between the substrates; and driving means, connected to the active elements, for supplying a drive voltage corresponding to display data to the given pixel electrode through the corresponding active element during a display operation, applying a voltage, which substantially nullifies a charge amount generated by spontaneous polarization of the ferroelectric liquid crystal, to the given pixel electrode through the corresponding active element at an end of the display operation, and thereafter stopping drive of the ferroelectric liquid crystal display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a graph showing the relationship between the applied voltage and the transmittance;

FIGS. 5A and 5B are views for explaining a method of driving a ferroelectric liquid crystal display element;

FIGS. 6A and 7A are views showing charge amounts generated by spontaneous polarization of the liquid crystal in the liquid crystal display element driven by the method shown in FIGS. 5A and 5B;

FIGS. 6B and 7B are views showing transmittances of the liquid crystal display element driven by the method in FIGS. 5A and 5B;

FIGS. 11A to 11H are timing charts showing the waveforms of voltages applied to the Kth to (K+7)th pixel electrodes in a method of driving ferroelectric liquid crystal display element according to the third embodiment of the present invention;

DETAILED DESCRIPTION OF THE PREFERRED EMBODIMENTS

Preferred embodiments of the present invention will be described in detail with reference to the accompanying drawings.

(First Embodiment)

Figure 1:
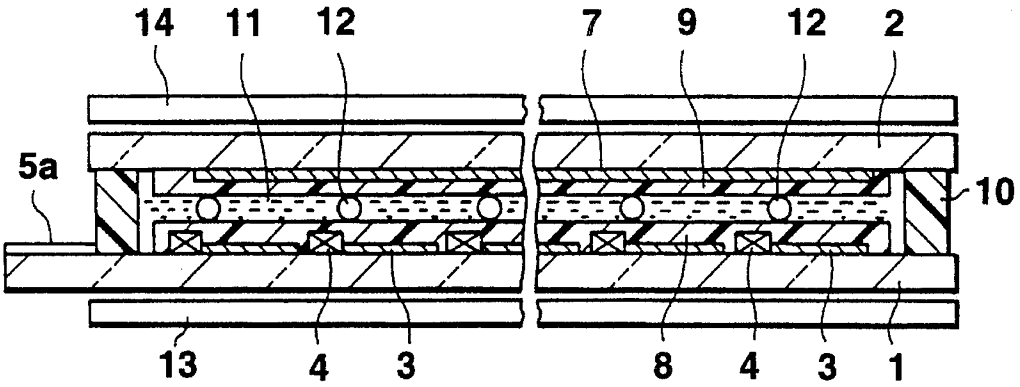
FIG. 1 is a sectional view showing the structure of a display element of a liquid crystal display device according to the first embodiment of the present invention.

The structure of an element of a ferroelectric liquid crystal display device according to this embodiment will be described below. FIG. 1 is a sectional view of the ferroelectric liquid crystal display element, and FIG. 2 is a plan view of a substrate on which pixel electrodes and active elements of the ferroelectric liquid crystal display element are formed.

This ferroelectric liquid crystal display element is of an active matrix scheme. The ferroelectric liquid crystal display element has a pair of transparent substrates (e.g., glass substrates) 1 and 2. Referring to FIG. 1, transparent pixel electrodes 3 and active elements 4 electrically connected to the pixel electrodes 3 are formed on the lower-side substrate (to be referred to as a lower substrate hereinafter) 1 in a matrix form.

The active elements 4 are constituted by, e.g., thin film transistors (to be referred to as TFTs hereinafter). Each TFT 4 comprises a gate electrode formed on the lower substrate 1, a gate insulating film which covers the gate electrode, a semiconductor layer formed on the gate insulating film, and source and drain electrodes formed on the semiconductor layer.

Figure 2:
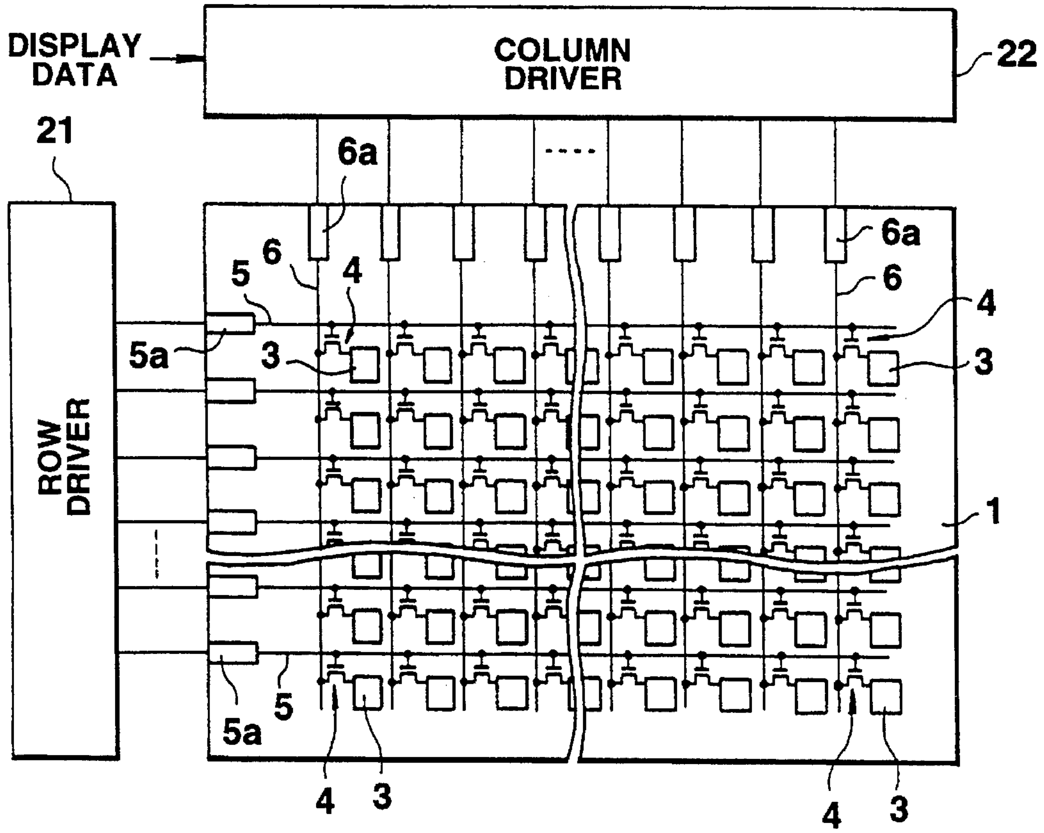
FIG. 2 is a plan view showing the structure of a lower substrate of the liquid crystal display element shown in FIG. 1.

Gate lines (scanning lines) 5 are formed between the row pixel electrodes 3, and data lines (gradation signal lines) 6 are formed between the column pixel electrodes 3, as shown in FIG. 2. The gate electrode of each TFT 4 is connected to the corresponding gate line 5, and the drain electrode is connected to the corresponding data line 6.

Each data line 6 is connected to a row driver 21 through one end portion 5*a*, and each data line 6 is connected to a column driver 22 through one end portion 6*a*. The row driver 21 applies a gate voltage (to be described later) to scan the corresponding gate line 5. On the other hand, the column driver 22 receives display data (gradation data) and applies a data signal corresponding to the display data to the corresponding data line 6. The gate signal and the data signal will be described in detail later.

The gate line 5 is covered with the gate insulating film (transparent film) of the TFT 4 except for the end portion 5*a*. Each data line 6 is formed on this gate insulating film. Each pixel electrode 3 is formed on the gate insulating film and connected to the source electrode of the corresponding TFT 4.

Referring to FIG. 1, a transparent counter electrode 7 opposing each pixel electrode 3 on the lower electrode is formed on an upper-side electrode (to be referred to as an upper substrate) 2. The counter electrode 7 is constituted by one electrode which covers the entire display area and is applied with a predetermined reference voltage V0.

Aligning films 8 and 9 are formed on the electrode formation surfaces of the lower and upper substrates 1 and 2, respectively. The aligning films 8 and 9 are horizontal aligning films consisting of an organic polymer compound such as polyimide. An aligning treatment such as rubbing is performed on the opposite surfaces of the aligning films 8 and 9.

The lower and upper substrates 1 and 2 are adhered to each other through a frame-like seal member 10 at their edge. A liquid crystal 11 is sealed in a space defined by the substrates 1 and 2 and the seal member 10. The liquid crystal 11 is a ferroelectric liquid crystal (to be referred to as a DHF liquid crystal hereinafter) having a chiral smectic C-phase whose helical pitch is smaller than the distance between the substrates 1 and 2 and having no memory function in an aligned state. The DHF liquid crystal 11 has a helical pitch equal to or smaller than the wavelength of a visible light range of 700 nm to 400 nm (e.g., 400 nm to 300 nm). The DHF liquid crystal 11 consists of a ferroelectric liquid crystal composition having a high spontaneous polarization level and a cone angle of about 27° to 45° (preferably 27° to 30°). Referring to FIG. 1, reference numerals 12 denote transparent gap members which regulate the distance between the substrates 1 and 2. This gap members 12 are distributed in the liquid crystal sealing area.

The DHF liquid crystal 11 forms a uniform laminar structure in which a normal to the layer of the laminar structure of the chiral smectic C-phase is aligned in a direction of the aligning treatment of the aligning films 8 and 9. The DHF liquid crystal 11 is sealed between the substrates 1 and 2 in a state of a helical structure because its helical pitch is smaller than the distance between the substrates. When a voltage having an absolute value larger than a predetermined value is applied between the pixel electrode 3 and the counter electrode 7, the DHF liquid crystal 11 is set in the first aligned state in which the director of the liquid crystal molecules are aligned in the first direction or the second aligned state in which the directors of the liquid crystal molecules are aligned in the second direction. When a voltage having an absolute value smaller than the predetermined value is applied between the pixel electrode 3 and the counter electrode 7, the molecular arrangement of the DHF liquid crystal 11 is distorted, and the DHF liquid crystal 11 is set in an intermediate state between the first and second aligned states.

A pair of polarizing plates 13 and 14 are disposed above and under the liquid crystal display element. The relationship between the transmission axes of the polarizing plates 13 and 14 and the alignment direction of the liquid crystal molecules of the DHF liquid crystal 11 will be described with reference to FIGS. 3A to 3C.

Figure 3A:
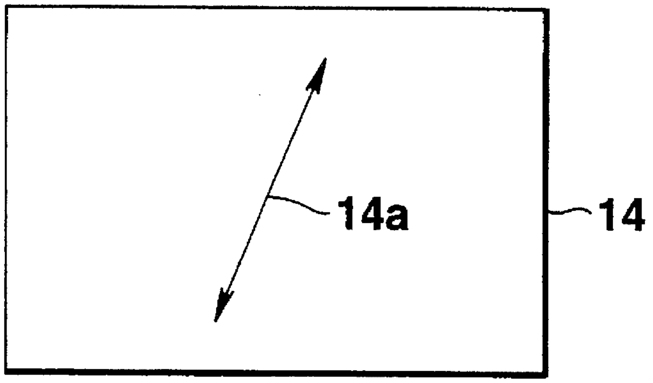
FIG. 3A is a view showing the direction of a transmission axis of an upper polarizing plate.
Figure 3B:
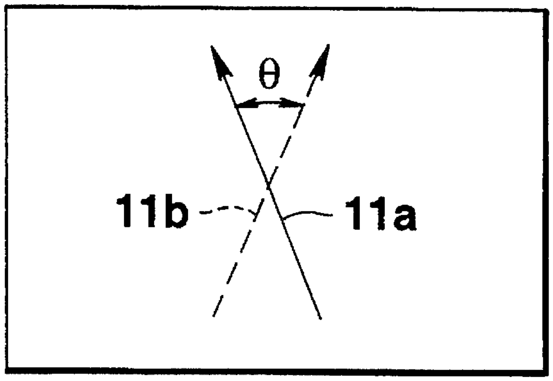
FIG. 3B is a view showing the direction of alignment of liquid crystal molecules.
Figure 3C:
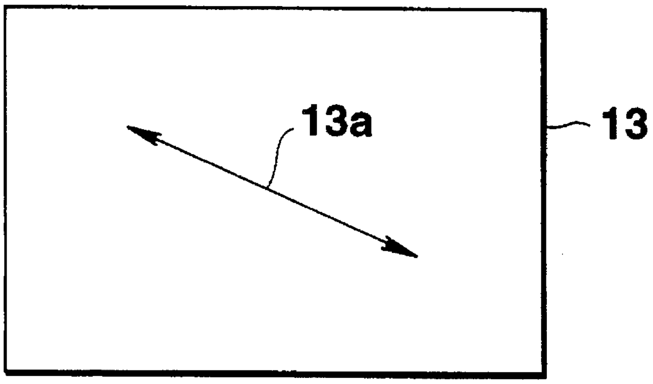
FIG. 3C is a view showing the direction of a transmission axis of a lower polarizing plate.

FIG. 3A shows a transmission axis 14*a* of the upper-side polarizing plate (to be referred to as an upper polarizing plate hereinafter) 14 in FIG. 1. FIG. 3B shows aligning directions (directions of directors) 11*a* and 11*b* of the liquid crystal molecules in the first and second aligned states of the DHF liquid crystal 11. FIG. 3C shows a transmission axis 13*a* of a lower-side polarizing plate (to be referred to as a lower polarizing plate hereinafter) 13 in FIG. 1.

When a voltage having one polarity and an absolute value equal to or larger than the predetermined value is applied to the DHF liquid crystal 11, the DHF liquid crystal 11 is set in the first aligned state, and each liquid crystal molecule is aligned in the first aligning direction 11*a* indicated by a solid line in FIG. 3B. However, when a voltage having the other polarity and an absolute value equal to or larger than the predetermined value is applied to the DHF liquid crystal 11, the DHF liquid crystal 11 is set in the second aligned state, and each liquid crystal molecule is aligned in the second aligning direction 11*b* indicated by a broken line in FIG. 3B.

The angle between the first and second aligning directions 11*a* and 11*b* varies depending on the types of DHF liquid crystals 11. This angle is selected to fall within the range of 25° to 45°, and preferably 27° to 45°.

The transmission axis of one of the polarizing plates 13 and 14, e.g., the transmission axis 14*a* of the upper polarizing plate 14 is almost parallel to one of the two aligning directions 11*a* and 11*b* of the DHF liquid crystal, e.g., the second aligning direction 11*b*. The transmission axis 13*a* of the lower polarizing plate 13 is almost perpendicular to the transmission axis 14*a* of the upper polarizing plate 14.

In the ferroelectric liquid crystal display element whose transmission axes of the polarizing plates 13 and 14 are set as shown in FIGS. 3A to 3C, the transmittance upon aligning the liquid crystal molecules in the first aligning direction 11*a* is the highest (display is the brightest). The transmittance upon aligning the liquid crystal molecules in the second aligning direction 11*b* is the lowest (display is the darkest). More specifically, in a state wherein the directors of the liquid crystal molecules are aligned in the first aligning direction 11*a*, linearly polarized light passing through the incident-side polarizing plate (polarizer) becomes nonlinearly polarized light in accordance with the polarization function of the DHF liquid crystal 11. Of all the light components passing through the liquid crystal layer, a component parallel to the transmission axis of the exit-side polarizing plate (analyzer) is transmitted and emerges, thereby making the display bright. However, in a state wherein the directors of the liquid crystal molecules are aligned in the second aligning direction 11*b*, almost no linearly polarized light passing through the incident-side polarizing plate is subjected to the polarizing function of the DHF liquid crystal 11 and is directly transmitted through the liquid crystal layer. For this reason, most of the light components passing through the liquid crystal layer are absorbed by the other polarizing plate, thus making the display dark.

The average direction of the directors of the DHF liquid crystal 11 is continuously changed between the aligning directions 11*a* and 11*b* in accordance with the polarity and the voltage value (absolute value) of the applied voltage. For this reason, the transmittance of this ferroelectric liquid crystal display element can be continuously changed.

FIG. 4 shows the general voltage vs. transmittance characteristics (changes in light transmittance as a function of the applied voltage) of the above ferroelectric liquid crystal display element. The transmittance of the ferroelectric liquid crystal display element changes in accordance with changes in applied voltage, as shown in FIG. 4.

Since this ferroelectric liquid crystal display element is of an active matrix scheme, the voltage applied to the DHF liquid crystal 11 can be held even during a nonselection period. For this reason, the ferroelectric liquid crystal display element having the above arrangement can theoretically change the transmittance to perform gradation display. However, when the present inventors made a drive test of the above ferroelectric liquid crystal display element, the gradation could not be controlled.

The contents of the drive test made by the present inventors will be described with reference to FIGS. 5A to 7B.

FIG. 5A is a waveform chart of a gate signal applied to the gate line 5 in the above drive test. FIG. 5B is a waveform chart of a data signal applied to the data line 6 in the above drive test. The data signal is a signal obtained by alternately repeating a reset pulse P1 having a voltage value for aligning the DHF liquid crystal 11 in the first aligning direction 11*a*, a write pulse P2 having a voltage corresponding to a display gradation level, a reset pulse P3 having a voltage value for aligning the DHF liquid crystal 11 in the second aligning direction 11*b*, and a write pulse P4. In this drive test, the reference voltage (the same voltage as that applied to the counter electrode 7) of the data signal is set at 0 V.

The reset pulses P1 and P3 are pulses for resetting the DHF liquid crystal 11 in the first or second aligned state. When the reset pulse P1 has the same polarity as that of the reset pulse P3, a DC voltage component exceeding an allowable value is applied to the DHF liquid crystal 11. For this reason, the voltages of the reset pulses have opposite polarities.

FIGS. 6A, 6B, 7A, and 7B show the transmittance and the charge amount (average charge amount corresponding to the average aligned state of the DHF liquid crystal 11) generated by spontaneous polarization of the DHF liquid crystal 11 upon driving the ferroelectric liquid crystal display element using the gate and data signals shown in FIGS. 5A and 5B. FIGS. 6A and 6B show the measurement results obtained when the voltage values of the reset pulse P1, the write pulse P2, the reset pulse P3, and the write pulse P4 are 7.5 V, 0 V, −7.5 and 0 V, respectively. FIGS. 7A and 7B show the measurement results obtained when the voltage values of the reset pulse P1, the write pulse P2, the reset pulse P3, and the write pulse P4 are 7.5 V, 3.3 V, −7.5 V, and −3.3 V, respectively.

As can be understood from FIGS. 6A, 6B, 7A, and 7B, in the above drive test, the voltage values of the write pulses P2 and P4 did not correspond to the transmittances. Therefore, the gradation could not be controlled.

More specifically, when the same transmittance is obtained upon applying the pulses P2 and P4 having the same voltage, reproducible gradation display can be performed. However, in the above drive test, as shown in FIGS. 6A and 6B, even if the write pulses P2 and P4 have the same voltage (P2=P4=0 V), different transmittances of the liquid crystal display are obtained, and display gradation is not reproducible. In addition, in the above drive test, as shown in FIGS. 7A and 7B, a clear transmittance difference could not be obtained even if the write pulses P2 and P4 had different voltage values (P2=3.3 V and P4=−3.3 V).

The above test results are caused by the hysteresis (FIG. 4) in the voltage vs. transmittance characteristics of the ferroelectric liquid crystal display element using the DHF liquid crystal. More specifically, during application of the write pulse P2, the DHF liquid crystal 11 is set in the first aligned state (more accurately, in an aligned state close to the first aligned state, which corresponds to a held voltage having a capacitance formed by the pixel and counter electrodes 3 and 7 and the DHF liquid crystal 11 sealed therebetween). During application of the write pulse P4, the DHF liquid crystal 11 is set in the second aligned state (an aligned state close to the second aligned state). For these reasons, the aligned states before applying the write pulses P2 and P4 are different from each other. The voltages of the write pulses P2 and P4 thus do not correspond to the aligned states, i.e., the transmittances, of the DHF liquid crystal 11.

In this embodiment, in order to obtain a transmittance corresponding to a write voltage, the following drive method is employed. An initializing voltage in which a pulse for aligning the DHF liquid crystal 11 in the first aligned state is continuous with a pulse for aligning the DHF liquid crystal 11 in the second aligned state is applied to the DHF liquid crystal 11, and thereafter a write voltage corresponding to display data is applied to the DHF liquid crystal 11.

This driving method will be described with reference to FIGS. 8A to 8D.

FIGS. 8A to 8D show a gate signal applied by the row driver 21 to the gate lines 5 connected to the TFTs 4 of the first row, a data signal applied by the column driver 22 to the data lines 6, a charge amount (average charge amount) generated by spontaneous polarization of the DHF liquid crystal 11, and the transmittance of the liquid crystal element.

Referring to FIGS. 8A to 8D, reference symbol TF denotes a one-frame period; TS, a selection period of the TFTs 4 of the first row; and T0, a nonselection period. Each selection period TS is equally divided into four slots t1, t2, t3, and t4. A one-slot period Δt is about 45 μs.

The first slot t1 is a period in which a compensation pulse P11 is applied, the slot t2 is a period in which a first reset pulse P12 is applied, the slot t3 is a period in which a second reset pulse P13 is applied, and the last slot t4 is a period in which a write pulse P14 is applied.

The write pulse P14 is a pulse having a voltage VD corresponding to the display data. The compensation pulse P11 is a pulse for compensating for a localized DC voltage component in the DHF liquid crystal 11 upon application of the write pulse P14. The compensation pulse 11 has a polarity opposite to that of the write pulse P14. The absolute value of a voltage −VD of the compensation pulse P11 is equal to that of the voltage VD of the write pulse P14. The voltage VD of the write pulse P14 is controlled to have various values in accordance with the display data, and the voltage −VD of the compensation pulse P11 is controlled accordingly.

The second reset pulse P13 is a pulse for eliminating an influence of hysteresis of the liquid crystal display element. A voltage −VR of this reset pulse P13 has a value enough to align almost all the directors of the molecules of the DHF liquid crystal 11 in the second aligning direction 11*b*. The first reset pulse P12 is an opposite-phase pulse for compensating for a localized DC voltage component in the DHF liquid crystal 11 upon applying the second reset pulse P13. The voltage VR of the first reset pulse P12 has an absolute value equal to that of the voltage VR of the second reset pulse P13. The first and second reset pulses P12 and P13 constitute the initializing voltage.

The polarities and voltage values of the pulses P11, P12, P13, and P14 are determined with respect to the polarity and voltage of the reference voltage V0 of the data signal. The reference voltage V0 is equal to that applied to the counter electrode 7.

According to this driving method, the write voltage VD is controlled to fall within the range of V0 to Vmax, provided that the minimum value of the write voltage is defined as V0 and its maximum value Vmax is defined as a value slightly smaller than that of the reset voltage VR of the second reset pulse P13.

Figures 8A, 8B, 8C, 8D:
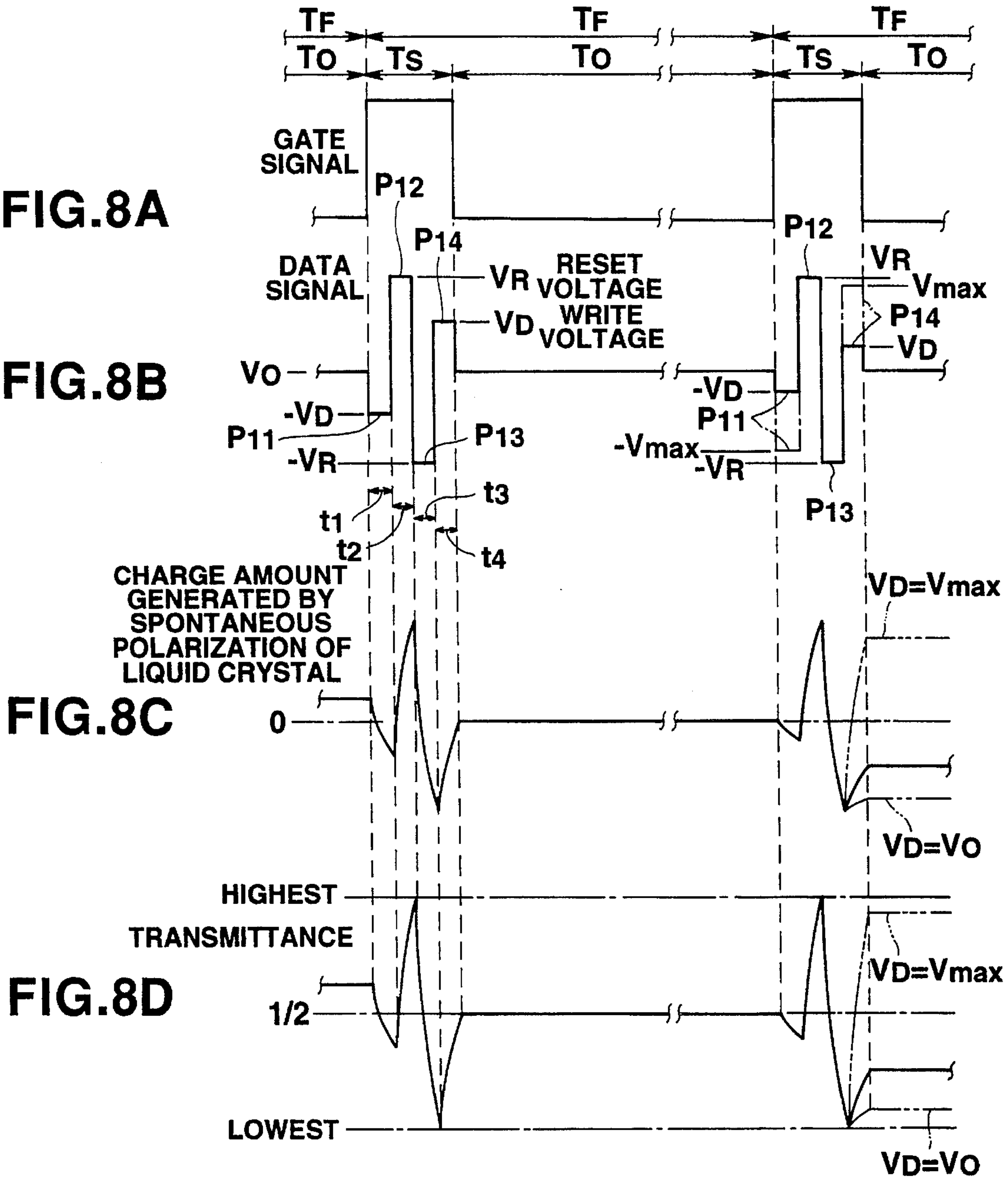
FIG. 8A is a waveform chart of a gate signal supplied to a gate line in the method of driving the ferroelectric liquid crystal display element according to the first embodiment of the present invention.
FIG. 8B is a waveform chart of a data signal supplied to a data line in the method of driving the ferroelectric liquid crystal display element according to the first embodiment of the present invention.
FIG. 8C is a waveform chart showing a charge amount generated by spontaneous polarization of the liquid crystal in the liquid crystal display element driven by the method of the first embodiment.
FIG. 8D is a view showing the transmittance of the liquid crystal display element driven by the method according to the first embodiment.

When the above ferroelectric liquid crystal display element is driven using the gate and data signals having the above waveforms, the voltage (compensation voltage) −VD of the compensation pulse P11, the voltage (first reset voltage) VR of the first reset pulse P12, the voltage (second reset voltage) −VR of the second reset pulse P13, and the voltage (write voltage) VD of the write pulse P14 are sequentially applied to each pixel electrode 3 through the corresponding TFT 4 during the selection period TS of each row. Therefore, the charge amount generated by spontaneous polarization of the liquid crystal 11 and the transmittance change, as shown in FIGS. 8C and 8D.

In the nonselection period T0, the TFTs 4 are turned off, and a voltage corresponding to the write voltage VD applied to the element during the last slot t4 of the selection period TS is held in a capacitance formed by the pixel and counter electrodes 3 and 7 and the liquid crystal 11 sealed therebetween. For this reason, during the nonselection period T0, the charge amount generated by spontaneous polarization of the DHF liquid crystal 11 and the transmittance are maintained to have a value corresponding to the voltage held in the capacitance, i.e., the value corresponding to the write voltage VD.

According to this driving method, the first reset voltage VR and the second reset voltage −VR are applied to the DHF liquid crystal 11 in the same order. The aligned state of the DHF liquid crystal 11 immediately before the write voltage VD is applied is kept identical in all the selection periods TS (i.e., a state in which the directors are aligned in the second aligning direction 11*b*). Therefore, the write voltage VD can be caused to correspond to the transmittance without being influenced by the hysteresis of the liquid crystal display element. The transmittance is controlled by the write voltage VD, thereby realizing clear gradation display.

For example, if the write voltage VD is ½ the reset voltage VR, the charge amount generated by spontaneous polarization of the DHF liquid crystal 11 during the nonselection period TO upon applying the write voltage VD becomes almost zero. At this time, the aligned state of the DHF liquid crystal 11 is an intermediate aligned state between the first and second aligned states. The average direction of the directors of the liquid crystal molecules is a central direction between the first and second aligning directions 11*a* and 11*b*. Therefore, the transmittance of the liquid crystal display element is set to an intermediate value between the highest transmittance obtained when the liquid crystal molecules are aligned in the first aligning direction 11*a* and the lowest transmittance obtained when the liquid crystal molecules are aligned in the second aligning direction 11*b*.

If the write voltage VD is ¼ the reset voltage VR, the charge amount generated by spontaneous polarization of the DHF liquid crystal 11 during the nonselection period T0 upon applying the write voltage VD has a negative value. At this time, the average aligning direction of the liquid crystal molecules is an intermediate direction between the second aligning direction 11*b* and an intermediate direction between the first and second aligning directions 11*a* and 11*b*. Therefore, the transmittance of the liquid crystal display element has an intermediate value between the intermediate transmittance and the lowest transmittance.

If the write voltage VD becomes the voltage V0, the charge amount generated by spontaneous polarization of the DHF liquid crystal 11 has the smallest value within the control range, as indicated by chain double-dashed lines in FIGS. 8C and 8D. The directors of the liquid crystal molecules are aligned in a direction close to the second aligning direction 11*b*. For this reason, the transmittance has the smallest value within the control range.

If the write voltage VD is set to the voltage Vmax, the charge amount generated by spontaneous polarization of the DHF liquid crystal 11 has the largest value, as indicated by chain triple-dashed lines in FIGS. 8C and 8D. The directors of the liquid crystal molecules are aligned in a direction closer to the first aligning direction 11*a*. For this reason, the transmittance has the largest value within the control range.

In this manner, according to the above driving method, since the transmittance corresponding to the write voltage VD is obtained, the transmittance is controlled in accordance with the write voltage VD, thereby realizing clear gradation display.

Figure 9:
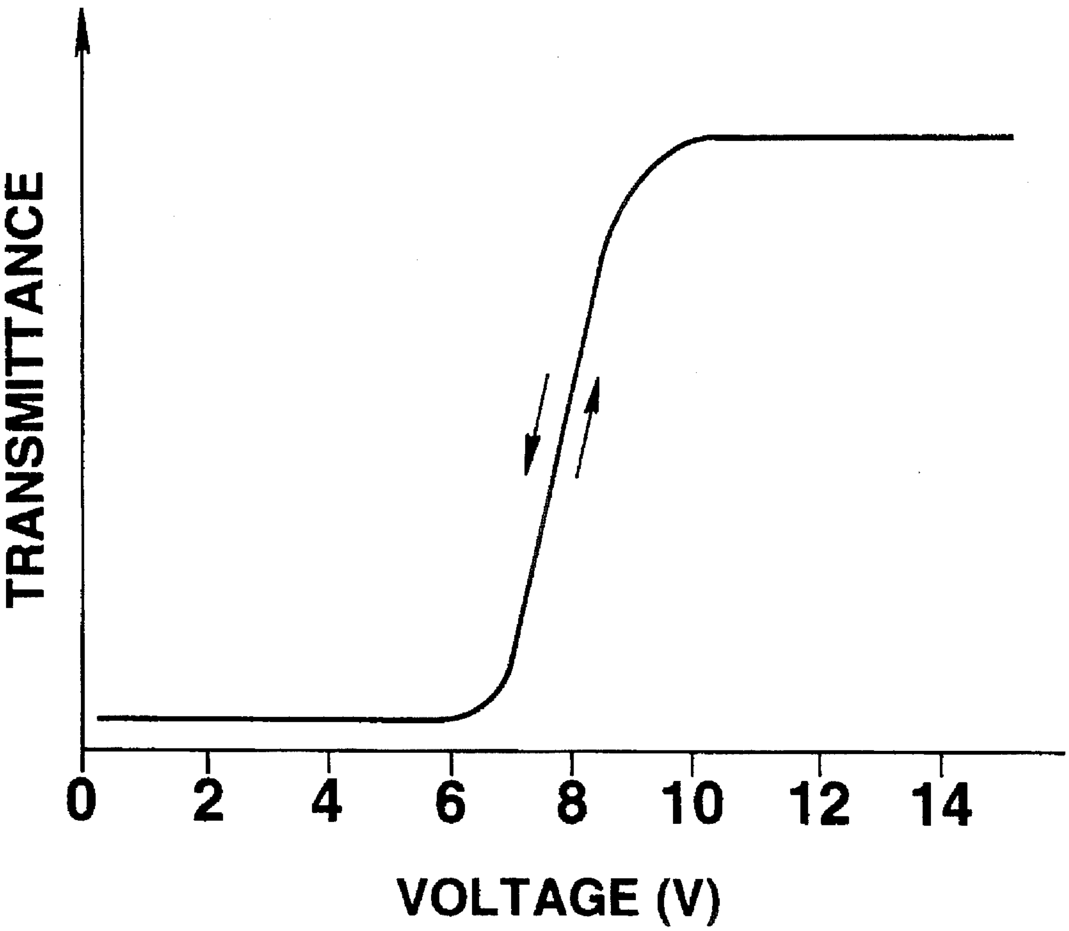
FIG. 9 is a graph showing the relationship between the applied voltage and the transmittance in the liquid crystal display element driven by the method according to the first embodiment.

FIG. 9 is a graph showing the voltage vs. transmittance characteristics obtained when the DHF ferroelectric liquid crystal display element is driven by the driving method of this embodiment. As shown in FIG. 9, the voltage vs. transmittance characteristics of this ferroelectric liquid crystal display element are free from any hysteresis. The voltage vs. transmittance characteristics shown in FIG. 9 are obtained when the reference voltage V0 of the data signal is set to 8 V (this voltage is equal to that applied to the counter electrode 7). In this case, the first reset voltage VR is set 10 V or more (preferably 11 V or more), the second reset voltage –VR is set to 6 V or less (preferably 5 V or less), and the write voltage VD is controlled within the range of about 6.5 V to about 10.5 V.

In the above driving method, the first reset voltage VR and the second reset voltage –VR are applied once for each selection period TS between the electrodes 3 and 7. For this reason, a DC voltage component exceeding an allowable value will not be applied to the DHF liquid crystal 11. Therefore, the display sticking phenomenon and degradation of the liquid crystal will not occur.

In the above embodiment, the first reset voltage VR and the second reset voltage –VR are applied to the liquid crystal display element in the order named. However, the order of applying the voltages may be reversed. The reset voltages VR and –VR may be voltages for aligning most of the liquid crystal molecules in the first and second aligning directions 11*a* and 11*b*, but need not be voltages for perfectly aligning the liquid crystal molecules in the aligning directions 11*a* and 11*b*.

In the above embodiment, the first reset voltage VR and the second reset voltage –VR are applied once for each selection period TS to the liquid crystal display element. However, the number of times of applying the reset voltages VR and –VR may be an arbitrary number. It is essential to apply the first reset voltage VR and the second reset voltage –VR alternately for the same number of times to the DHF liquid crystal 11.

In the above embodiment, the transmission axis 14*a* of the lower polarizing plate 14 is set almost parallel to the second aligning direction 11*b* of the DHF liquid crystal 11. However, the above driving method is also applicable to a DHF liquid crystal display element wherein the transmission axis 14*a* of the polarizing plate 14 is almost parallel to the first aligning direction 11*a* of the DHF liquid crystal 11 and the transmission axis 13*a* of the upper polarizing plate 13 is almost perpendicular to the transmission axis 14*a*. In this liquid crystal display element, the transmittance of the liquid crystal display element is the highest when the directors of the liquid crystal molecules are aligned in the second aligning direction 11*b*, and the transmittance is the lowest when the directors of the liquid crystal molecules are aligned in the first aligning direction 11*a*. The driving method of this embodiment is not limited to a method of driving an arrangement using a TFT as an active element, but is equally applicable to a method of driving a ferroelectric liquid crystal display element using an MIM as an active element.

An arrangement of the row and column drivers 21 and 22 for realizing the above driving method will be described with reference to FIG. 10.

The column driver 22 comprises, for example, a timing signal generator 31, a voltage generator 32, a selection signal generator 33, and a selector 34. For example, the selection signal generator 33 and the selector 34 are arranged for each data line. The timing signal generator 31 and the voltage generator 32 are commonly arranged for the plurality of data lines 6.

The timing signal generator 31 generates a clock signal of, e.g., a period At (=TS/4). The voltage generator 32 generates a plurality of voltages applied to the data lines 6.

The selection signal generator 33 receives the above clock signal and display data in units of pixels. Assuming that the display data of the pixels of the first row, the second row, . . . , are defined as X1, X2, . . . , the selection signal generator 33 generates selection data –X1, XR, –XR, and X1 for the selection period TS of the TFTs of the first row, selection data X2, XR, –XR, and X2 for the selection period TS of the TFTs 4 of the second row, and similar selection data for the remaining rows. The selector 34 selects each of the plurality of voltages supplied from the voltage generator 32 so as to correspond to the selected data for each Δt and applies the selected voltage to the data lines 6.

On the other hand, the row driver 21 comprises a scanning (address) data generator 41 and a driver 42. The scanning data generator 41 generates a data string corresponding to a gate signal in accordance with a clock signal supplied from the timing signal generator 31 and supplies the data string to the driver 42. A voltage corresponding to the output data from the scanning data generator 41 is applied to the gate lines 5.

The row driver 21 and the column driver 22 are arranged as described above to generate the gate and data signals having the waveforms shown in FIGS. 8A and 8B.

(Second Embodiment)

In the first embodiment, the DHF liquid crystal is used as the ferroelectric liquid crystal. However, an SBF liquid crystal may be used as the ferroelectric liquid crystal. In the second embodiment, a method of driving a ferroelectric liquid crystal display element using the SBF liquid crystal will be described.

The arrangement of the ferroelectric liquid crystal display element of this embodiment is substantially the same as that of the ferroelectric liquid crystal display element of the first embodiment and has an arrangement shown in FIGS. 1 and 2.

A bistable ferroelectric liquid crystal, i.e., an SBF liquid crystal 11 having a chiral smectic phase whose helical pitch is smaller than the distance between both substrates 1 and 2 is sealed in this ferroelectric liquid crystal display element. The SBF liquid crystal 11 has a helical pitch equal to or smaller than the wavelength of a visible light range of 700 nm to 400 nm (e.g., 400 nm to 300 nm). The SBF liquid crystal 11 consists of a ferroelectric liquid crystal composition having a high spontaneous polarization level and a large cone angle (e.g., about 27° to 45° (preferably 27° to 30°)).

The SBF liquid crystal 11 in a state of a helical structure is sealed between the substrates 1 and 2 because the helical pitch of the crystal 11 is smaller than the distance between the substrates.

The relationship between the transmission axes of polarizing plates 13 and 14 and the aligning direction of the liquid crystal molecules of the SBF liquid crystal 11 is the same as in the first embodiment. When a voltage having one polarity and an absolute value equal to or larger than a predetermined value is applied to the SBF liquid crystal 11, it is set in the first stable state, and the directors of the liquid crystal molecules are aligned in a first aligning direction 11*a* indicated by a solid line in FIG. 3B. When a voltage having the other polarity and an absolute value equal to or larger than the predetermined value is applied to the SBF liquid crystal 11, it is set in the second stable state, and the directors of the liquid crystal molecules are aligned in a second aligning direction 11*b* indicated by a broken line in FIG. 6B. An angle 8 between the first and second aligning directions 11*a* and 11*b* varies depending on the types of SBF liquid crystals 11. The angle 8 is selected to fall within the range of 25° to 45°, and preferably 27° to 45°.

The transmission axis of one of the polarizing plates, e.g., the transmission axis 14*a* of the upper polarizing plate 14 is almost parallel to one of the two aligning directions 11*a* and 11*b* of the SBF liquid crystal, i.e., the second aligning direction 11*b*, as shown in FIG. 3A. The transmission axis 13*a* of the lower polarizing plate 13 is almost perpendicular to the transmission axis 14*a* of the upper polarizing plate 14, as shown in FIG. 3C. In the ferroelectric liquid crystal display element whose transmission axes of the polarizing plates 13 and 14 are set as shown in FIGS. 3A to 3C, the transmittance upon aligning the liquid crystal molecules in the first aligning direction 11*a* is the highest as in the first embodiment. The transmittance upon aligning the liquid crystal molecules in the second aligning direction 11*b* is the lowest as in the first embodiment.

The SBF liquid crystal 11 is also aligned in a state (intermediate aligned state) in which the liquid crystal molecules set in the first stable state and the liquid crystal molecules set in the second stable state are mixed in accordance with the polarities and the voltage values (absolute values) of the applied voltages. Since this ferroelectric liquid crystal display element is of an active matrix scheme, the voltage applied to the SBF liquid crystal 11 can be held even during a nonselection period. For this reason, the ferroelectric liquid crystal display element having the above arrangement can change the transmittance to perform gradation display.

However, when the present inventors made a drive test of the above ferroelectric liquid crystal display element, the gradation could not be controlled as in the first embodiment. More specifically, when gate and data signals shown in FIGS. 5A and 5B are applied to gate and data lines 5 and 6 of the liquid crystal display element in which the SBF liquid crystal 11 is sealed, the same test result as in FIGS. 6A, 6B, 7A, and 7B was obtained, and the voltage values of write pulses P2 and P4 did not correspond to the transmittances.

This is because the voltage vs. transmittance characteristics of the ferroelectric liquid crystal display element using the SBF liquid crystal 11 have a hysteresis. That is, when the write pulse P2 is applied to the element, the SBF liquid crystal 11 is set in the first stable state. When the write pulse P4 is applied to the element, the SBF liquid crystal 11 is set in the second stable state. The voltage values of the write pulses P2 and P4 do not correspond to the aligned states, i.e., transmittances, of the SBF liquid crystal 11 due to this difference between the aligned states.

In this embodiment, a selection period TS of each row is divided into four slots t1 to t4 as in the first embodiment. As shown in FIGS. 8A and 8B, a compensation pulse P11 is applied to the SBF liquid crystal 11 during the slot t1, a first reset pulse P12 is applied to the SBF liquid crystal 11 during the slot t2, a second reset pulse P13 is applied to the SBF liquid crystal 11 during the slot t3, and a write pulse P14 is applied to the SBF liquid crystal 11 during the last slot t4.

In this embodiment, the compensation pulse P11 is a pulse having a polarity opposite to and the same absolute voltage value as those of the write pulse P14. A voltage VD of the write pulse P14 is controlled to have various values in accordance with display data, and a voltage –VD of the compensation pulse P11 is controlled accordingly. A voltage value VR of the second reset pulse P13 is a value enough to orient most of the liquid crystal molecules of the SBF liquid crystal 11 in the second direction. The first reset pulse P12 has a polarity opposite to and the same absolute voltage value as those of the second reset pulse P13.

According to this driving method, the first reset voltage VR for setting the SBF liquid crystal 11 in the first stable state and the second reset voltage –VR for setting the SBF liquid crystal 11 in the second stable state are applied to the element for each selection period TS in the order named. For this reason, the aligned state of the SBF liquid crystal 11 immediately before the write voltage VD is applied is kept identical in all the selection periods TS. Therefore, the write voltage VD can be caused to correspond to the transmittance. The transmittance is controlled in accordance with the write voltage VD, thereby realizing clear gradation display.

According to this driving method, the first reset voltage VR and the second reset voltage –VR are applied to the SBF liquid crystal 11 once for each selection period. For this reason, a DC voltage component exceeding the allowable value will not be applied to the SBF liquid crystal 11.

The order of applying the reset voltages VR and –VR may be reversed. The reset voltages VR and –VR may be voltages for aligning most of the liquid crystal molecules in the first and second aligning directions 11A and 11*b*, but need not be voltages for perfectly aligning the liquid crystal molecules in the aligning directions 11*a* and 11*b*. The number of times of applying the reset voltages VR and −VR may be two or more. It is essential to apply the first reset voltage VR and the second reset voltage −VR alternately for the same number of times to the SBF liquid crystal 11.

This driving method is applicable to a method of driving a ferroelectric liquid crystal display element wherein the transmission axis 14*a* of the upper polarizing plate 14 is almost parallel to the aligning direction 11*a* of the SBF liquid crystal 11 and the transmission axis 13*a* of the lower polarizing plate 13 is almost perpendicular to the transmission axis 14*a*. In addition, this driving method is also applicable to a method of driving a ferroelectric liquid crystal display element having an MIM or the like as an active element.

As described above, according to the driving method of this embodiment, clear gradation display can be performed in the ferroelectric liquid crystal display element of the active matrix scheme using the ferroelectric liquid crystal (SBF liquid crystal) having a helical pitch smaller than the distance between the substrates and a memory function.

Figure 10:
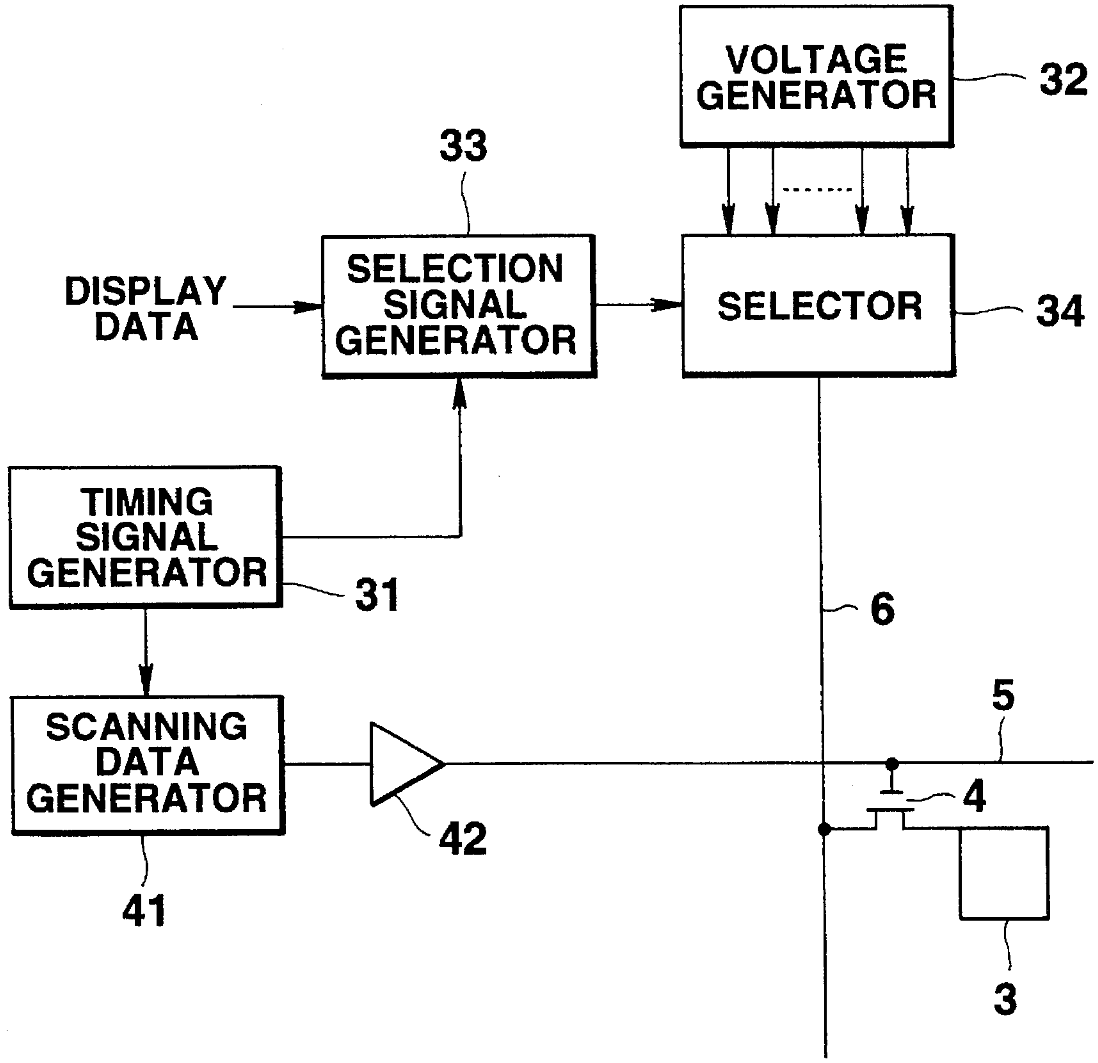
FIG. 10 is a block diagram showing the arrangement of row and column drivers.

The arrangement of row and column drivers 21 and 22 for realizing the driving method of this embodiment is the same as in the first embodiment, as shown in FIG. 10.

(Third Embodiment)

In the first and second embodiments, the four pulses P11 to P14 must be applied to the data lines for each selection period TS. The selection period TS is prolonged, and the arrangement of the display controller is complicated. The third embodiment is made to solve these problems.

The arrangement of a ferroelectric liquid crystal display element of this embodiment is substantially the same as the liquid crystal display element of the first embodiment. A liquid crystal 11 consists of a DHF liquid crystal as in the first embodiment.

A method of driving the ferroelectric liquid crystal display element of this embodiment will be described with reference to FIGS. 11A to 11H and 12A to 12H.

FIGS. 11A to 11H show the waveforms of voltages applied to pixel electrodes 3 of arbitrary Kth to (K+7)th rows (K=8n+1 where n is 0 or a positive integer) of the liquid crystal display element of this embodiment. FIGS. 12A to 12H show the waveforms of voltages applied to gate lines 5 of the first to 16th rows and each data line 6.

The selection period (write period) of the pixels of each row (each gate line) consists of a first half selection period and a second half selection period. The first half selection period has the same timing throughout a plurality (eight) of rows, while the second half selection period has different timings for the respective rows. Each of the first and second half selection periods is divided into slots each having a period Δt (e.g., about 45 μs). The fist half slot of the first half selection period is a period for applying a first reset pulse P12. The second half slot of the first half selection period is a period for applying a second reset pulse P13. The first half slot of the second half selection period is a period for applying a compensation pulse P11. The second half slot of the second half selection period is a period for applying a write pulse P14.

As shown in FIGS. 12A to 12D, a row driver 21 simultaneously applies the gate pulse to the gate lines 5 of the first to eighth rows during the first half selection period of the pixels of the first to eighth rows to simultaneously turn on TFTs 4 of the first to the eighth rows. During this period, a column driver 22 sequentially applies the first reset pulse P12 having positive polarity and the second reset pulse P13 having negative polarity to all the data lines 6, as shown in FIG. 12H. The second reset pulse P13 is a pulse for setting the DHF liquid crystal 11 in the second aligned state so as to eliminate the hysteresis of the liquid crystal display element. A voltage value −VR of the second reset pulse P13 is a value enough to align most of the liquid crystal molecules in a second direction 11*b*. The first reset pulse P12 is a pulse for compensating for a DC voltage component exceeding the allowable level in the DHF liquid crystal 11 upon applying the second reset pulse P13. The voltage of the first reset pulse P12 has the same absolute value as that of the second reset pulse P13 but has a polarity opposite thereto.

The polarities and voltage values of the pulses P11, P12, P13, and P14 are determined with reference to the polarity and voltage of a reference voltage V0 of the data signal. The reference voltage V0 is equal to that applied to a counter electrode 7.

The pulse width of the gate signal supplied to the gate line 5 is smaller than the width of the pair of first and second reset pulses P12 and P13 supplied to the data line 6 because the voltage level of the data signal must be accurately held by a capacitance (a capacitance constituted by the pixel and counter electrodes 3 and 7 and the DHF liquid crystal 11) of each pixel. For the illustrative convenience, a difference between the pulse width of the gate pulse and that of the pulse pair on the data line is emphasized in FIGS. 12A to 12H.

When the gate signal is disabled, the TFTs 4 are turned off, and the capacitances of the pixels of the first to eighth rows have a voltage almost equal to the voltage −VR of the second reset pulse P13. White (light transmission) is written in each pixel by a positive voltage, and black (light shielding) is written in each pixel by a negative voltage. In this case, all the pixels of the first to eighth rows are set in the black state (blanking).

Thereafter, in the second half selection period of the pixels of the first row, the row driver 21 supplies a gate pulse to the gate line 5 of the first row to turn on the TFTs (TFTs of the first row) 4 connected to the gate line 5 of the first row. On the other hand, the column driver 22 supplies, to each data line 6, the compensation pulse P11 and the write pulse P14 having the write voltage VD corresponding to the display gradation level of the pixels of the first row. The compensation pulse P11 is a pulse for preventing the DHF liquid crystal 11 from being applied with the DC voltage exceeding the allowable level upon applying the write pulse P14. The voltage of the compensation pulse P14 has a polarity opposite to and the same absolute voltage value as those of the write pulse P14.

The write voltage VD is controlled to fall within the range of V0 to Vmax, provided that the minimum value of the write voltage is defined as V0 and its maximum value Vmax is defined as a value slightly smaller than that of the reset voltage VR of the second reset pulse P13.

The row driver 21 disables the gate pulse while the write pulse P14 is kept supplied to the data line 6, thereby turning off the TFTs 4 of the first row. For this reason, the waveform of the voltage applied to the pixel electrodes 3 of the first row is constituted by a pair of the reset pulses P12 and P13 supplied during the first half selection period and a pair of the compensation pulse P11 and the write pulse P14 which are applied during the second half selection period, as shown in FIG. 11A.

The capacitance of each pixel of the first row can hold a voltage applied upon turn-OFF operations of the corresponding TFT 4 of the first row, i.e., the write voltage VD. For this reason,.each pixel of the first row holds a gradation level corresponding to the write voltage VD, i.e., a gradation level corresponding to the display data until the first half selection period of the next frame.

Figures 12A, 12B, 12C, 12D, 12E, 12F, 12G, 12H:
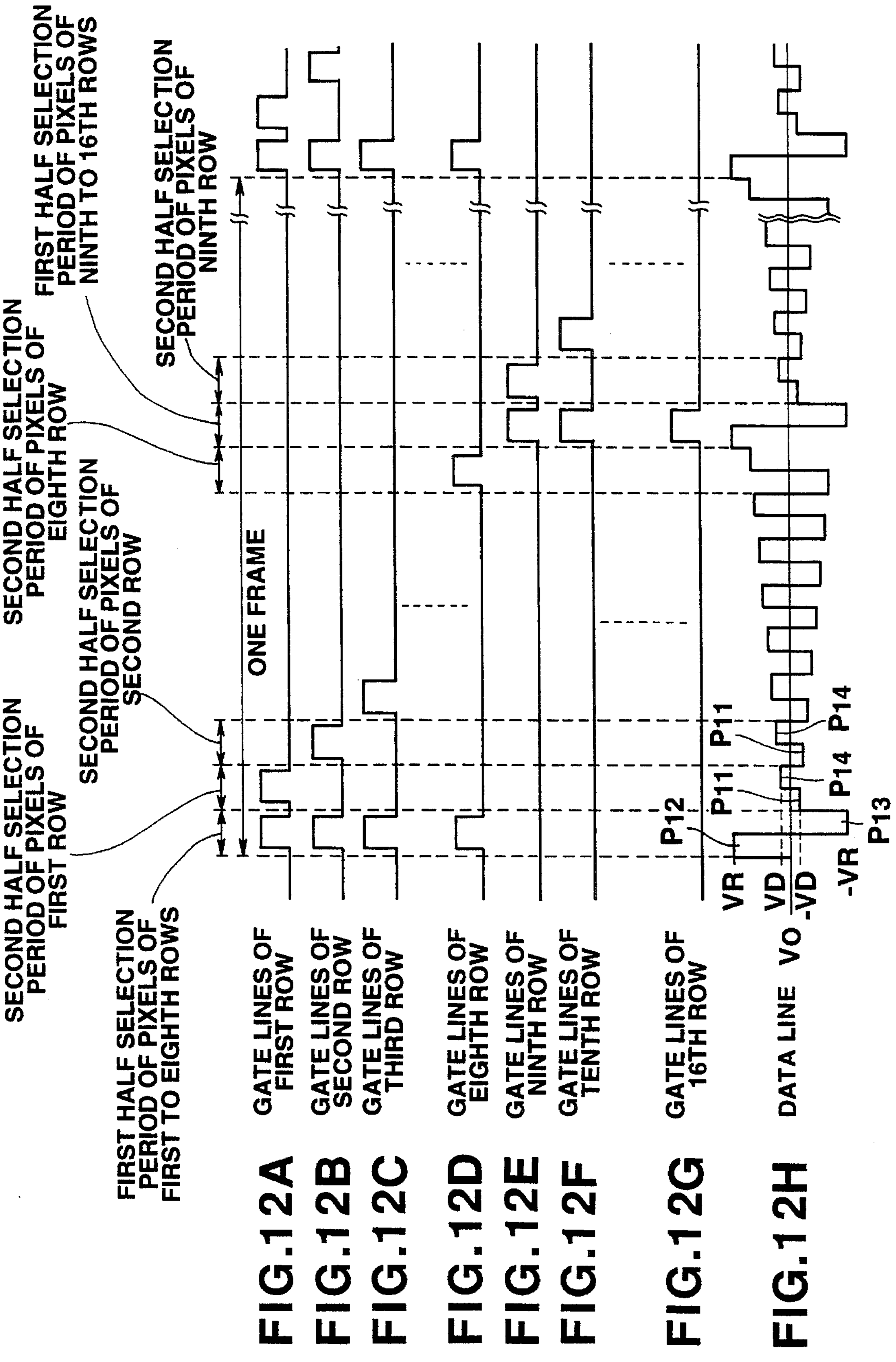
FIGS. 12A to 12G are timing charts showing the waveforms of voltages applied to the first to 16th gate lines in a method of driving a ferroelectric liquid crystal display element according to the third embodiment.
FIG. 12H is a timing chart showing the waveform of a voltage applied to a data line in the method of driving the ferroelectric liquid crystal display element according to the third embodiment.

Subsequently, in the second half selection periods of the gate lines 5 of the second row, the third row, . . . , the eighth row, as shown in FIGS. 12B to 12D, the row driver 21 sequentially applies a gate voltage to the gate lines of the second row, the third row, . . . , the eighth row. On the other hand, as shown in FIG. 12H, the column driver 22 supplies, to each data line 6, the compensation pulse P11 and the write pulse P14 having the write voltage VD corresponding to the display data. As a result, the pulse signal having the waveforms shown in FIGS. 11B to 11H are respectively supplied to the pixel electrodes 3 of the second to eighth rows. The capacitance of each pixel of the second to eighth rows holds the voltage applied upon turn-OFF operation of the corresponding TFT 4 of the second to eighth rows, i.e., a voltage almost equal to the write voltage VD. Therefore, each pixel maintains the gradation level corresponding to the display data until the next first half selection period of the gate lines of the first to eighth rows. Write access to the pixels of the first to eighth rows is thus completed.

Thereafter, in the first half selection period of the pixels of the ninth to 16th rows, the row driver 21 applies a gate voltage to the gate lines 5 of the ninth to 16th rows, as shown in FIGS. 12E to 12G. On the other hand, the column driver 22 supplies of a pair of the first and second pulses P12 and P13 to each data line 6. Thereafter, in the second half selection period of the pixels of the ninth to 16th rows, the row driver 21 sequentially supplies the gate signal to the gate lines 5 of the ninth row, the 10th row . . . , the 16th row, as shown in FIGS. 12E to 12G. On the other hand, the column driver 22 supplies the compensation pulse P11 and the write pulse P14 to each data line 6, as shown in FIG. 12H. As a result, the voltage pulses having the waveforms shown in FIGS. 11A to 11H are applied to the pixel electrodes 3 of the ninth to 16th rows. The pixels of the ninth to 16th rows maintain the gradation levels corresponding to the display data until the next first half selection period of the pixels of the ninth to 16th rows.

The above operations are repeated every eight rows. When write access of the pixels of all the rows is completed, the write operation is completed. When the next frame is initiated, the above operations are repeated from the pixels of the first row again.

The overall flow of the write operation described above is shown in FIGS. 13A to 13D.

Figure 13A:
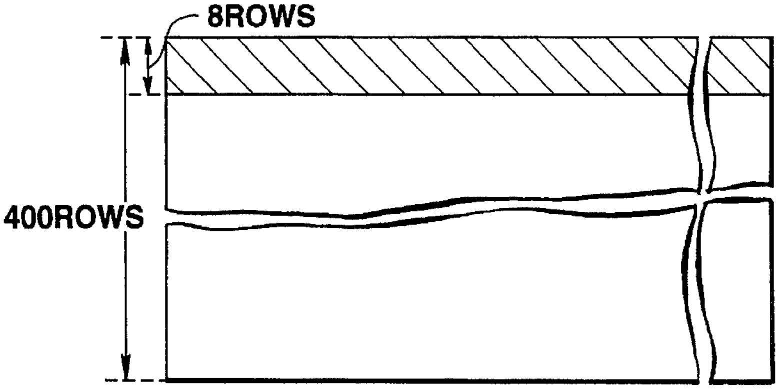
FIGS. 13A to 13D are views showing the procedures of writing data in the method of driving the liquid crystal display element according to the third embodiment.
Figure 13B:
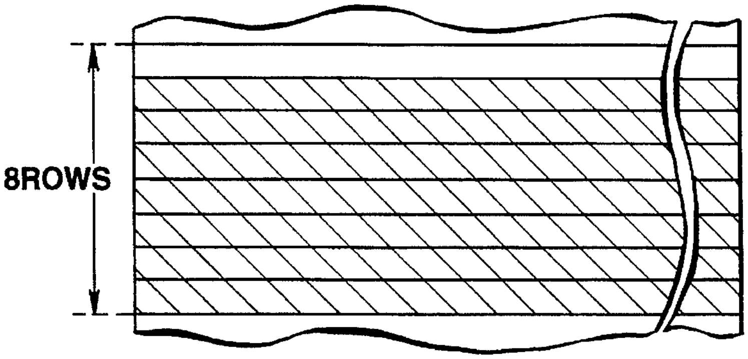
Figure 13C:
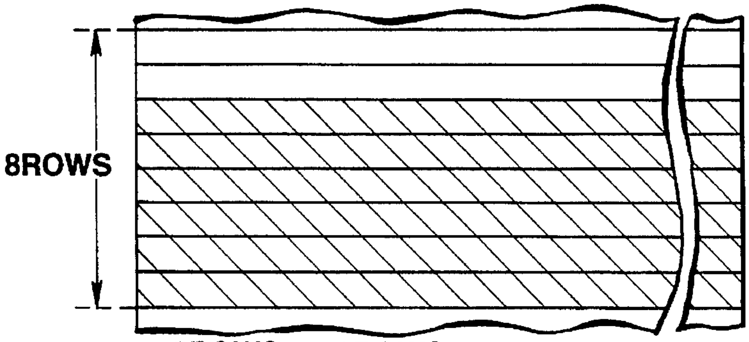
Figure 13D:
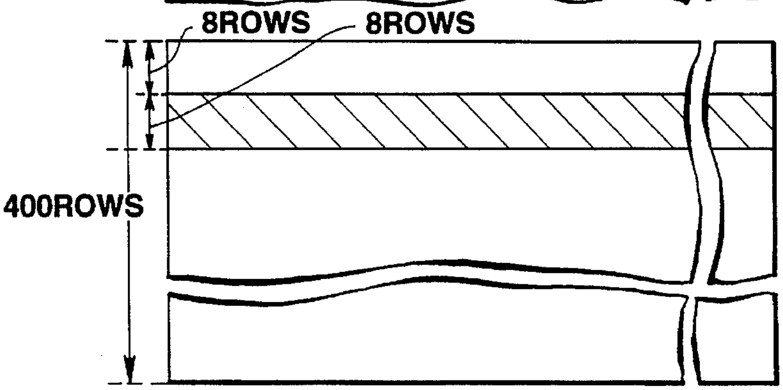

FIGS. 13A and 13D show one frame of this liquid crystal display element, and FIGS. 13B and 13C show eight rows of one frame.

A pair of reset pulses are supplied to the pixels of the first to eighth rows. As indicated by the hatched lines in FIG. 13A, all the pixels of the first to eighth rows are set in a black (blank) state (the first half selection period of the pixels of the first to eighth rows). A pair of the compensation pulse P11 and the write pulse P14 are supplied to the pixels of the first row. As shown in FIG. 13B, the pixels of the first row are set to have gradation levels corresponding to display data (the second half selection period of the pixels of the first row).

A pair of the compensation pulse P11 and the write pulse P14 are then supplied to the pixels of the second row. As shown in FIG. 13C, the pixels of the second row are set to have gradation levels corresponding to the display data (the second half selection period of the pixels of the second row).

The above operations are repeated until the pixels of the eighth row. The pixels of the first to eighth rows are set to have gradation levels corresponding to the display data.

Thereafter, a pair of the reset pulses P12 and P13 are supplied to the pixels of the ninth to 15th rows to set all the pixels of the ninth to 15th rows in a black (blank) state, as shown in FIG. 13D (the first half selection period of the pixel of the ninth to 15th rows). A pair of the compensation pulse P11 and the write pulse P14 are sequentially supplied to the pixel electrodes 3 of the ninth to 15th rows to set the pixels of these rows to have gradation levels corresponding to the display data, as shown in FIGS. 13B and 13C.

The above operations are then repeated. When write access of display data for one frame is completed, the above operations are repeated from the beginning.

According to the above embodiment, the pair of first and second reset pulses are simultaneously supplied to the pixels of a plurality of rows. For this reason, as compared with a case wherein a pair of reset pulses are supplied to the pixels of each row within a corresponding selection period, the write time for one frame can be shortened. In addition, data processing in the column driver 22 can be facilitated to simplify the structure of the column driver 22.

The arrangement of the row and column drivers 21 and 22 for realizing the above operations is substantially the same as that shown in FIG. 10. Assuming the display data of the pixels of the first row, the second row . . . as X1, X2 . . . , X8, X9, . . . , a selection signal generator 33 inserts data XR and −XR corresponding to the reset voltages VR and −VR every eight pixels and generates selection data XR, −XR, −X1, X1, −X2, X2, −X3, −X8, X8, XR, −XR, −X9, X9 . . . .

Figure 14A:
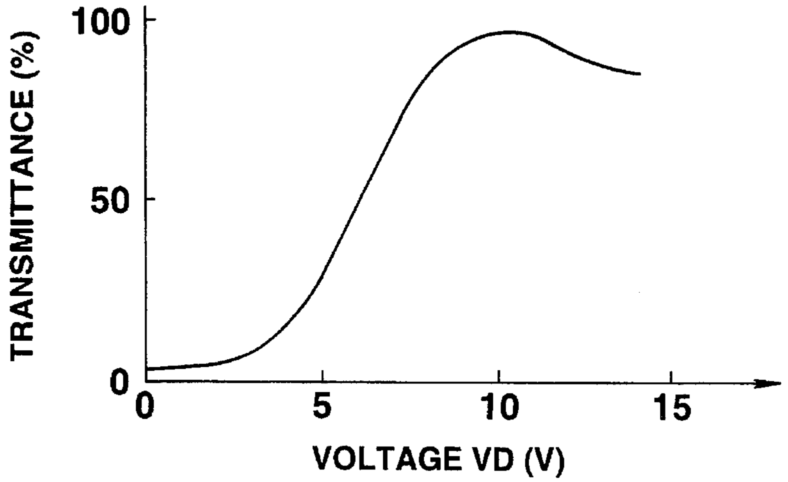
FIGS. 14A and 14B are graphs each showing the relationship between the applied voltage and the transmittance in the liquid crystal display element driven by the method according to the third embodiment.
Figure 14B:
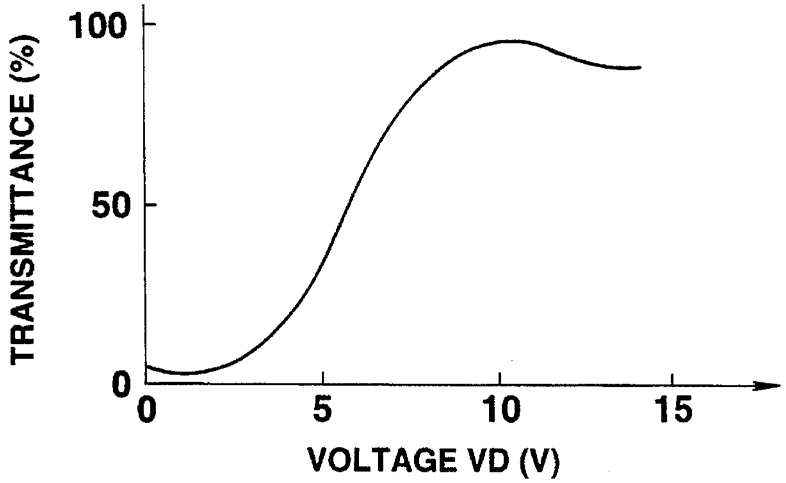

Gradation control of the ferroelectric liquid crystal display element is performed in accordance with the above driving method. In this driving method, a pulse width fit was set to 45 μs, the reset voltage VR was set to 17 V, and the write voltage VD fell within the range of $0 \leqq VD \leqq 14$ V. The results are shown in FIGS. 14A and 14B. FIG. 14A shows characteristics obtained when a reset pulse pair and a write pulse pair are continuously supplied to pixels, as shown in FIG. 11A and FIG. 14B show characteristics obtained when a write pulse pair is applied to pixels seven selection periods ($7 \cdot 2\Delta t$) after a reset pulse pair is supplied to the pixels, as shown in FIG. 11H. In either case, clear gradation display can be performed.

As described above, in order to accurately hold the signal level on the data line 6 in a capacitance constituted by the pixel and counter electrodes 3 and 7 and the DHF liquid crystal 11, the gate voltage is preferably disabled immediately before the signal level on the data line changes.

In the above embodiment, the eight gate lines have the first half selection periods of the same timing or the common first half selection period. The number of rows having the first half selection periods of the same timing is not limited to eight, but can be two or more. If the number of rows having the common first half selection period is excessively large, a time from the setting of a blanking state to write access of data to the pixels of the last row is undesirably prolonged, resulting in flickering of the display. However, when the number of rows having the common first half selection period is excessively small, a state equivalent to a case wherein the first half selection period is set for each row is set to prolong the write time of one frame. If the number of rows, i.e., gate lines 5 is experimentally about 200 to 400, the number of rows having the common first half selection period falls within the range of 6 to 10, and preferably 8.

The order of supplying the first and second reset pulses P12 and P13 need not be limited to a specific order. The first reset pulse P12 may be supplied after the second reset pulse P13 is supplied. In this case, each pixel is set in the white (light transmission) state for the first half selection period, and then at a gradation level corresponding to display data for the second half selection period. Note that each pixel is preferably set in the black state for the first half selection period because human eye is more sensitive to white than black.

The reset voltages VR and −VR have voltage values enough to align most of the directors of the liquid crystal molecules of the DHF liquid crystal 11 in the first or second aligning direction 11*a* or 11*b*. The reset voltages VR and −VR need not perfectly align all the directors in the aligning direction 11*a* or 11*b*.

In the above embodiment, the first and second reset pulses are supplied to the pixels once for each first half selection period. However, if the number of times Of supplying the first pulse is identical to that of supplying the second pulse, the number of times may be twice or more.

The driving method of this embodiment is also applicable to a method of driving a ferroelectric liquid crystal display element wherein a transmission axis 14*a* of an upper polarizing plate 14 is almost parallel to the first aligning direction 11*a* of the DHF liquid crystal 11. This driving method is further applicable to a ferroelectric liquid crystal display element having an MIM or the like as an active element.

As described above, according to this embodiment, since a pair of first and second reset pulses are simultaneously applied to a plurality of gate lines, the write time for one field can be shortened.

(Fourth Embodiment)

The third embodiment exemplifies the ferroelectric liquid crystal display using the DHF liquid crystal. However, the same effect as described above can also be obtained even if the driving method of the third embodiment is applied to an SBF liquid crystal display element in which an SBF liquid crystal is sealed.

(Fifth Embodiment)

When the power switch of a liquid crystal display element is turned off, the charge amount generated by spontaneous polarization of a liquid crystal 11 generally has a positive or negative value. In this state, an internal electric field is formed in a liquid crystal layer by spontaneous polarization of the liquid crystal 11. On the other hand, in a liquid crystal display element of an active matrix type, even if the power switch is turned off, the charge held by each pixel does not immediately disappear, and the internal electric field is also retained. As a result, after the power switch is turned off, negative and positive ions in the liquid crystal layer are separately attracted to lower and upper substrates 1 and 2 with a lapse of time, and ionic localization becomes conspicuous. Finally, the ions are adsorbed in the surfaces of the substrates 1 and 2, and the liquid crystal molecules are constrained by the charge generated by the localized ions, thereby causing a display burn-in phenomenon.

In the fifth embodiment, at the end of display, a voltage for almost nullifying the charge amount generated by the spontaneous polarization of the liquid crystal 1 is applied between electrodes 3 and 7 of all the pixels before stopping driving of the element.

The structure of the ferroelectric liquid crystal display element of the fifth embodiment is substantially the same as that of the liquid crystal display element of the first embodiment.

Operations at the end of display will be described with reference to FIGS. 15A to 15D.

In a normal state, the liquid crystal display element of this embodiment is driven in accordance with the driving method of the first embodiment. On the other hand, when a display end switch of the display device is operated or a display end time set in a timer is alarmed, a display end command signal is sent to row and column drivers.

Figures 15A, 15B, 15C, 15D:
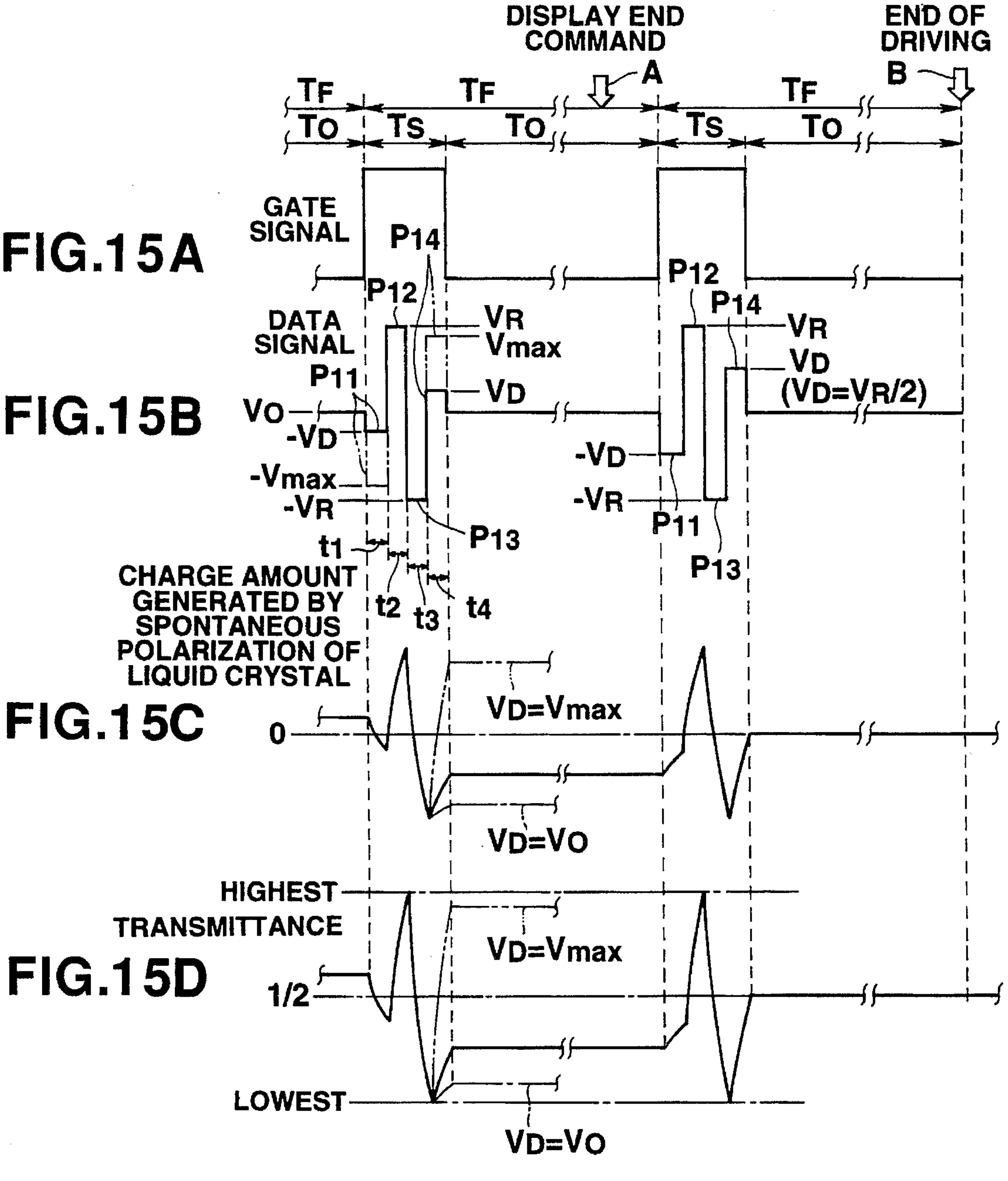
FIG. 15A is a waveform chart showing a gate signal applied to a gate line in a method of driving a ferroelectric liquid crystal display element according to the fifth embodiment of the present invention.
FIG. 15B is a waveform chart showing a data signal supplied to a data line in the method of driving the ferroelectric liquid crystal display element according to the fifth embodiment.
FIG. 15C is a waveform chart showing a charge amount generated by spontaneous polarization of the liquid crystal in the liquid crystal display element driven by the method according to the first embodiment.
FIG. 15D is a view showing the transmittance of the liquid crystal display element driven by the method according to the first embodiment.

Referring to FIG. 15A, an arrow A represents a timing at which the display end command signal is input to row and column drivers 21 and 22. This display end command signal is input at an arbitrary timing within a one-frame period TF.

The row and column drivers 21 and 22 continue a driving operation according to normal display data during the frame-period TF within which the display end command signal is input. When the next frame period TF is initiated, the row and column drivers 21 and 22 neglect the display data and set a voltage VD of a write pulse P14 supplied to all data lines 6 to have a value for almost nullifying the charge amount generated by spontaneous polarization of the DHF liquid crystal 11. A voltage −VD of a compensation pulse P11 is also controlled accordingly. Voltages VR and −VR of reset pulses P12 and P13 used in display driving are kept unchanged.

The write voltage VD for almost nullifying the charge amount generated by spontaneous polarization of the DHF liquid crystal 11 is almost ½ the reset voltage VR. When the write voltage VD is set to VR/2, the charge amount generated by spontaneous polarization of the liquid crystal 11 during a subsequent nonselection period T0 becomes almost zero, as shown in FIG. 15C.

At this time, the aligned state of the DHF liquid crystal 11 is a state in which liquid crystal molecules are aligned, drawing a helical trace substantially without any distortion. The average direction of the directors is an almost intermediate direction between first and second aligning directions 11*a* and 11*b*. For this reason, the transmittance in this state has an almost intermediate value between the highest transmittance obtained when the liquid crystal molecules of the DHF liquid crystal 11 are aligned in the first aligning direction 11*a* and the lowest transmittance obtained when the liquid crystal molecules are aligned in the second aligning direction 11*b*. Therefore, when driving using the write voltage VD (VD=VR/2) continues for a one-frame period, the entire display screen is set at an intermediate brightness level.

After driving using the write voltage VD (VD=VR/2) continues for the one-frame period, a drive circuit is powered off to stop display driving. Referring to FIGS. 15A to 15D, an arrow B represents a drive stop timing. In this embodiment, the drive circuit is powered off when the period of the frame TF has elapsed.

According to this driving method, as described above, the voltage for almost nullifying the charge amount generated by spontaneous polarization of the DHF liquid crystal 11 is applied between the pixel and counter electrodes 3 and 7. Therefore, the display device can be powered off in a state wherein almost no internal electric field generated by spontaneous polarization of the liquid crystal 11 is present. The display burn-in phenomenon does not occur, and high display quality of the liquid crystal display element can be maintained.

Figure 16:
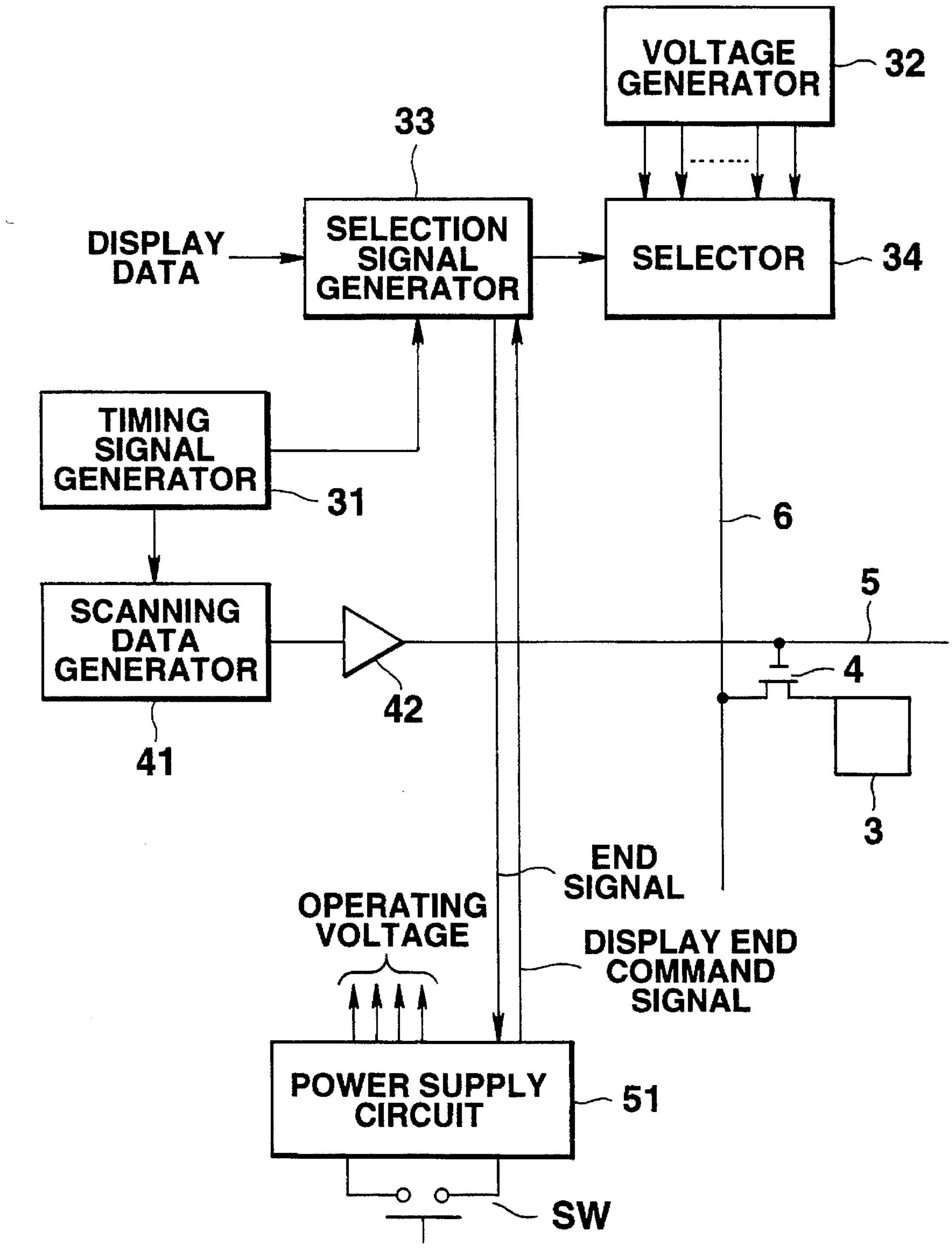
FIG. 16 is a block diagram showing the arrangement of row and column drivers and a power supply circuit.

An arrangement of the row and column drivers 21 and 22 and a power supply circuit 51, which realizes the above driving method will be described with reference to FIG. 16. The same reference numerals as in FIG. 10 denote the same parts in FIG. 16.

The power supply circuit 51 comprises a power switch SW and supplies an operating voltage to a timing signal generator 31, a voltage generator 32, a selection signal generator 33, a selector 34, a scanning data generator 41, an amplifier 4, and a driver 42. The power switch SW is a switch for designating ON/OFF operation of the power supply to the power supply circuit 51. When the power switch SW is turned off, the power supply circuit 51 supplies the display end command signal to the selection signal generator 33. Note that the power supply circuit 51 continuously outputs the operating voltage immediately after the power switch SW is turned off.

The selection signal generator 33 generates selection data corresponding to display data during the frame TF within which the display end command signal is input, as in the first embodiment.

On the other hand, in the next frame within which a display end command signal is input, the selection signal generator 33 sequentially generates selection data –XR/2, XR, –XR, XR/2, –XR/2, XR, –XR, XR/2 . . . The selector 34 selects one of the plurality of voltages applied from the voltage generator 32 so as to correspond to selected data every lapse of a TS/4 period. Therefore, the signal having the waveform shown in FIG. 15B is supplied to the data line 6, and the charge amount generated by spontaneous polarization of the DHF liquid crystal 11 becomes almost zero.

When the selection signal generator 33 continues this process within the one-frame period TF, the generator 33 outputs an end signal to the power supply circuit 51. In response to this end signal, the power supply circuit 51 stops outputting the operating voltage. With this arrangement, at the end of display, the charge amount generated by spontaneous polarization of the liquid crystal can be almost zero.

In the above embodiment, the period for applying the voltage for almost nullifying the charge amount generated by spontaneous polarization of the DHF liquid crystal 11 is defined as the one-frame period TF. However, the voltage application time may continue exceeding the one-frame period.

In the above embodiment, the voltage for almost nullifying the charge amount generated by spontaneous polarization of the DHF liquid crystal 11 is applied to the data line 6 in a frame period next to the frame in which a display end command signal is input. However, this voltage may be applied simultaneously when a display end command signal is input or when a predetermined period of time has elapsed upon inputting a display end command signal. In this case, the voltage is kept applied during a period corresponding to at least the one-frame period TF or more, and then the operating voltage is stopped.

Alternatively, when the power supply circuit outputs a display end command signal, the gate signal may be supplied to all the gate lines, and the voltage for almost nullifying the charge amount generated by spontaneous polarization may be simultaneously applied to all the pixels.

In the above embodiment, the DHF liquid crystal is used. However, the driving method of this embodiment is also applicable to a method of driving a ferroelectric liquid crystal display using an SBF liquid crystal having a memory function. When the ferroelectric liquid crystal display element using the SBF liquid crystal is driven by the above driving method, the aligned state of the liquid crystal upon turning off the power switch is in a state in which liquid crystal molecules in the first and second aligned states are mixed almost at a ratio of 1:1. For this reason, the spontaneous polarization components of the SBF liquid crystal cancel each other, and the charge amount generated by spontaneous polarization of the SBF liquid crystal becomes almost zero.

In a normal state, the liquid crystal display element may be driven by any of the first to fourth driving methods or any other method.

In the ferroelectric liquid crystal display element driven in the above embodiment, a transmission axis 14*a* of one polarizing plate 14 is almost parallel to a second aligning direction 11*b* of the liquid crystal 11. The above driving method is also applicable to a method of driving a ferroelectric liquid crystal display element wherein the transmission axis 14*a* of the upper polarizing plate 14 is almost parallel to a first aligning direction 11*a*. This driving method is further applicable to a ferroelectric liquid crystal display element having an MIM or the like as an active element.

As described above, according to the driving method of this embodiment, after the voltage for almost nullifying the charge amount generated by spontaneous polarization of the ferroelectric liquid crystal is applied to the liquid crystal display element, its driving is stopped. Therefore, the display burn-in phenomenon can be prevented, and high display quality of the liquid display element can be maintained.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of driving a ferroelectric liquid crystal display element, comprising the steps of:

preparing a ferroelectric liquid crystal display element having a first substrate on which a plurality of pixel electrodes and a plurality of active elements connected to said pixel electrodes are arranged in a matrix form, a second substrate on which a counter electrode opposing said pixel electrodes is formed, and a ferroelectric liquid crystal sealed between said first and second substrates, said ferroelectric liquid crystal having a helical structure with a smaller helical pitch than a distance between said substrates and a wave length of a visible light range, and said ferroelectric liquid crystal being aligned in a first aligned state in which liquid crystal molecules are aligned substantially in a first direction substantially without the helical structure in accordance with a voltage applied between said pixel electrodes and said counter electrode, a second aligned state in which the liquid crystal molecules are aligned substantially in a second direction substantially without the helical structure in accordance with the applied voltage, or an intermediate aligned state in which an average aligned direction of the liquid crystal molecules is an intermediate direction between the first direction and the second direction with the helical structure, and the average aligned direction being continuously changing between the first direction and the second direction by deforming the helical structure in accordance with a polarity and an absolute value of the applied voltage;

turning on a given one of said active elements during a selection period of said given active element;

applying an initializing voltage, which substantially cancels the helical structure of said ferroelectric liquid crystal and aligns said ferroelectric liquid crystal in one of the first and second aligned states, to a corresponding one of said pixel electrodes and said counter electrode through said given active element during the selection period; and applying a write voltage corresponding to display data between said corresponding pixel electrode and said counter electrode through said given active element during the selection period to control the deformation of the helical structure of said ferroelectric liquid crystal and set the ferroelectric liquid crystal in the intermediate aligned state after application of the initializing voltage.

2. A method according to claim 1, further comprising the step of applying a compensation voltage between said pixel and counter electrodes for each selection period prior to the application of the initializing voltage, the compensation voltage having a polarity opposite to and the same absolute value as those of the write voltage in the selection period.

3. A method according to claim 1, wherein the initializing voltage includes a first reset pulse for aligning the ferroelectric liquid crystal in the first aligned state and a second reset pulse for aligning liquid crystal molecules in the second aligned state.

4. A method according to claim 3, wherein the first reset pulse and the second reset pulse are applied between said pixel and counter electrodes in the same order for each selection period.

5. A method according to claim 3, wherein the first reset pulse and the second reset pulse have voltages having polarities opposite to each other and the same absolute value.

6. A method according to claim 3, wherein the number of the first reset pulses supplied for each selection period is equal to that of the second reset pulses for each selection period.

7. A method according to claim 1, wherein the selection period of said given active element includes first and second half selection periods, the first half selection period having a common timing for a plurality of rows of the matrix form, and the initializing voltage being applied between said pixel and counter electrodes for the first half selection period, and the second half selection period having different timings for the rows of the matrix form, and the write voltage (VD) being applied between said pixel and counter electrodes for the second half selection period.

8. A method according to claim 7, wherein the initializing voltage comprises a voltage for setting display of said ferroelectric liquid crystal display element in a dark state.

9. A method according to claim 7, wherein the initializing voltage comprises a pair of a first reset pulse for aligning the ferroelectric liquid crystal in the first aligned state and a second reset pulse for aligning liquid crystal molecules in the second aligned state, and a write voltage and the compensation voltage having a polarity opposite to and the same absolute value as those of the write voltage are applied between said pixel and counter electrodes for the second half selection period.

10. A method according to claim 1, wherein the initializing voltage has the same polarity in every display frame.

11. A method according to claim 1, wherein the initializing voltage sets the ferroelectric liquid crystal in the same aligned state in every display frame.

12. A method according to claim 1, wherein the write voltage is applied to the pixel electrode and to said counter electrode just after the application of the initializing pulse ends without any substantial rest time period.

13. A method according to claim 1, wherein said step of applying a writing voltage includes the substeps of:

generating n voltages when the display data designates one of n gradation wherein n is a positive integer equal to or I greater than 2 and wherein each of the n gradations corresponds to only one of said n voltages; and selecting and applying one of the n voltages in response to the display data.

14. A method according to claim 1, wherein said writing voltage comprises one pulse voltage whose voltage value is one of n (where n is a positive integer equal to or greater than 2) values when the display data designates one of n gradations.

15. A method according to claim 1, wherein said initializing voltage has a voltage level sufficient for eliminating effects of hysteresis in a voltage-transmittance characteristic of the ferroelectric liquid crystal display element.

16. A method according to claim 1, wherein the initializing voltage and said write voltage are applied to said pixel electrode and counter electrode, during a time that said active element is in one on-state or during a time that said active element turns on once.

17. The device according to claim 1, wherein said initializing voltage has a voltage level sufficient for eliminating effects of hysteresis in a voltage-transmittance characteristic of the ferroelectric liquid crystal display element.

18. A method of driving a ferroelectric liquid crystal display element, comprising the steps of:

preparing a ferroelectric liquid crystal display element having a first substrate on which a plurality of pixel electrodes and a plurality of active elements connected to said pixel electrodes are arranged in a matrix form, a second substrate on which a counter electrode opposing said pixel electrodes is formed, and a ferroelectric liquid crystal sealed between said first and second substrates, said ferroelectric liquid crystal having a smaller pitch than a distance between said substrates, and said ferroelectric liquid crystal being aligned in a first aligned state in which liquid crystal molecules are aligned substantially in a first direction in accordance with a voltage applied between said pixel electrodes and said counter electrode, a second aligned state in which the liquid crystal molecules are aligned substantially in a second direction in accordance with the applied voltage, or an intermediate aligned state in which an average aligned direction of the liquid crystal molecules is an intermediate direction between the first direction and the second direction, the average aligned direction continuously changing between the first direction and the second direction in accordance with a polarity and an absolute value of the applied voltage;

applying a first voltage corresponding to display data between each of said pixel electrodes and said counter electrode during the display operation; and applying a second voltage, which sets the average aligned direction at a substantial center direction of the first and second directions to substantially nullify a charge amount generated by spontaneous polarization of the ferroelectric liquid crystal, between said pixel and counter electrodes at an end of the display operation, and thereafter stopping drive of said ferroelectric liquid crystal display element.

19. A method according to claim 18, wherein the voltage for substantially nullifying the charge amount generated by spontaneous polarization of said ferroelectric liquid crystal is a voltage for setting said ferroelectric liquid crystal in an intermediate aligned state between the first and second aligned states.

20. The method according to claim 18, wherein:

said ferroelectric liquid crystal has a helical structure between said first and second substrates; and said second voltage sets said ferroelectric liquid crystal so as to have a non-deformed helical structure.

21. A ferroelectric liquid crystal display device comprising:

a ferroelectric liquid crystal display element having a pixel electrodes, active elements connected to said pixel electrodes, a first substrate on which said pixel electrodes and said active elements are arranged in a matrix form, a counter electrode opposing said pixel electrodes, a second substrate on which said counter electrode is formed, and a ferroelectric liquid crystal sealed between said first and second substrates and having a helical structure with a helical pitch smaller than a distance between said substrates and a wave length of a visible light range, and said ferroelectric liquid crystal being aligned in a first aligned state in which liquid crystal molecules are aligned substantially in a first direction substantially without the helical structure in accordance with a voltage applied between said pixel electrodes and said counter electrode, a second aligned state in which the liquid crystal molecules are aligned substantially in a second direction substantially without the helical structure in accordance with the applied voltage, or an intermediate aligned state in which an average aligned direction of the liquid crystal molecules is an intermediate direction between the first direction and the second direction with the helical structure, and the average aligned direction being continuously changing between the first direction and the second direction by deforming the helical structure in accordance with a polarity and an absolute value of the applied voltage;

first driving means connected to said active elements for sequentially turning on said active elements; and second driving means for applying a voltage for substantially canceling the helical structure and setting the ferroelectric liquid crystal in one of the first and second aligned states to a given one of said pixel electrodes through a corresponding one of said active elements which is turned on by said first driving means, and thereafter applying a voltage for controlling a deformation of the helical structure to set the average aligned direction between the first and second directions in correspondence with a display gradation level to said given pixel electrode through said corresponding active element.

22. An apparatus according to claim 21, wherein each of said active elements comprises a thin film transistor having a current path whose one end is connected to a corresponding one of said pixel electrodes, said first driving means comprises a gate line connected to gates of said thin film transistors of a corresponding row, and row driving means for applying a gate voltage to each gate line to turn on said thin film transistors, and said second driving means comprises a data line connected to the other end of the current path of each of the plurality of thin film transistors of a corresponding column, and column driving means for applying the initializing voltage to said data line and then applying the write voltage corresponding to the display gradation level to said data line.

23. An apparatus according to claim 22, wherein said column driving means applies, to said data line, the initializing voltage including a first pulse for setting said ferroelectric liquid crystal in the first aligned state and a second pulse for setting said ferroelectric liquid crystal in the second aligned state.

24. An apparatus according to claim 22, wherein said column driving means applies, to said data line, a compensation voltage having a polarity opposite to and the same absolute value as those of the write voltage.

25. An apparatus according to claim 22, wherein said first driving means turns on each active element for the first half selection period and the second half selection period having a different timing from that of the first half selection period, and said second driving means applies the initializing voltage to said corresponding pixel electrode for the first half selection period and applies a voltage changing in correspondence with a display gradation level of each pixel to said corresponding pixel electrode through said given active element for the second half selection period.

26. An apparatus according to claim 25, wherein the first half selection period has a common timing for a plurality of rows, and said first driving means simultaneously turns on active elements of a plurality of rows for the first half selection period, and the second half selection period has different timings for all rows, and said first driving means turns on active elements of each row at different timings for the second half selection period.

27. The device according to claim 21, wherein said second driving means applies the write voltage between the pixel electrode and said counter electrode just after the application of the initializing pulse ends, without any substantial rest time period.

28. The device according to claim 21, wherein said first driving means generates an initializing voltage which has the same polarity in every display frame.

29. The device according to claim 21, wherein the initializing voltage sets the ferroelectric liquid crystal in the same aligned state in every display frame.

30. The device according to claim 21, wherein said second driving means applies the initializing voltage and said write voltage between said pixel electrode and counter electrode, during a time that said active element is in one on-state or during a time that said active element turns on once by said first driving means.

31. The device according to claim 21, wherein said second driving means includes:

means for generating n voltages when the display data designates one of n gradations wherein n is a positive integer equal to or greater than 2 and wherein each of the n gradations corresponds to only one of said n voltages; and selecting and applying one of the n voltages in response to the display data.

32. The device according to claim 21, wherein said second driving means generates said writing voltage which comprises one pulse voltage whose voltage is one of n values when the display data designates one of n gradations, wherein n is an integer greater than or equal to 2.

33. A ferroelectric liquid crystal display device comprising:

a ferroelectric liquid crystal display element having pixel electrodes, active elements connected to said pixel electrodes, a first substrate on which said pixel electrodes and said active elements are arranged in a matrix form, a counter electrode opposing said pixel electrodes, a second substrate on which said counter electrode is formed, and a ferroelectric liquid crystal sealed between said first and second substrates and having a pitch smaller than a distance between said substrates and wave length of a visible light range, and said ferroelectric liquid crystal being aligned in a first aligned state in which liquid crystal molecules are aligned substantially in a first direction in accordance with a voltages applied between said pixel electrodes and said counter electrode, a second aligned state in which said ferroelectric liquid crystal molecules are aligned substantially in a second direction in accordance with the applied voltage, or an intermediate aligned state in which an average aligned direction of ferroelectric liquid crystal molecules is an intermediate direction between the first direction and the second direction, the average aligned direction continuously changing between the first direction and the second direction in accordance with a polarity and an absolute value of the applied voltage; and driving means, connected to said active elements, for supplying a drive voltage corresponding to display data to said given pixel electrode through said corresponding active element during a display operation, for applying a releasing voltage, which substantially sets the average aligned direction at a substantial center direction of the first and second directions to substantially nullify a charge amount generated by spontaneous polarization of said ferroelectric liquid crystal, to said given pixel electrode through said corresponding active element at an end of the display operation, and for thereafter stopping drive of said ferroelectric liquid crystal display element.

34. An apparatus according to claim 33, wherein the voltage for substantially nullifying the charge amount generated by spontaneous polarization of said ferroelectric liquid crystal is a voltage for almost nullifying an internal electric field of said ferroelectric liquid crystal.

35. The device according to claim 33, wherein:

said ferroelectric liquid crystal has a helical structure between said first and second substrates; and said releasing voltage sets said ferroelectric liquid crystal so as to have a non-deformed helical structure.

* * * * *